United States Patent
Madrigal et al.

(10) Patent No.: US 11,760,352 B2
(45) Date of Patent: Sep. 19, 2023

(54) NETWORK COMPUTER SYSTEM TO CONTROL FREIGHT VEHICLE OPERATION CONFIGURATIONS

(71) Applicant: Uber Technologies, Inc., San Francisco, CA (US)

(72) Inventors: Luis Madrigal, San Francisco, CA (US); Eyal Lasker, San Francisco, CA (US); Padmini Pyapali, San Francisco, CA (US)

(73) Assignee: UBER TECHNOLOGIES, INC., San Francisco, CA (US)

( * ) Notice: Subject to any disclaimer, the term of this patent is extended or adjusted under 35 U.S.C. 154(b) by 0 days.

(21) Appl. No.: 17/509,623

(22) Filed: Oct. 25, 2021

(65) Prior Publication Data

US 2022/0073072 A1 Mar. 10, 2022

Related U.S. Application Data

(63) Continuation of application No. 16/374,317, filed on Apr. 3, 2019, now Pat. No. 11,155,263.

(Continued)

(51) Int. Cl.
*B60W 30/16* (2020.01)
*G06F 16/2455* (2019.01)
(Continued)

(52) U.S. Cl.
CPC ....... *B60W 30/16* (2013.01); *G06F 16/24553* (2019.01); *G06Q 10/08355* (2013.01); *B60W 2300/126* (2013.01); *B60W 2754/10* (2020.02)

(58) Field of Classification Search
CPC ........... B60W 30/16; B60W 2300/126; B60W 2754/10; G06F 16/24553; G06Q 10/08355; G08G 1/22
See application file for complete search history.

(56) References Cited

U.S. PATENT DOCUMENTS

| 3,953,720 A | 4/1976 | Kelch |
| 6,411,897 B1 | 6/2002 | Gaspard, II |

(Continued)

FOREIGN PATENT DOCUMENTS

| CN | 101951545 | 1/2011 |
| CN | 103692969 | 4/2014 |

(Continued)

OTHER PUBLICATIONS

Scholl, Joachim, Nils Boysen, and Armin Scholl. "E-platooning: Optimizing platoon formation for long-haul transportation with electric commercial vehicles." European Journal of Operational Research 304.2 (2023): 525-542.*

(Continued)

*Primary Examiner* — Brian P Sweeney
(74) *Attorney, Agent, or Firm* — Dority & Manning, P.A.

(57) ABSTRACT

In some examples, a network computer system can monitor a plurality of mobile computing devices to determine a current location of a corresponding freight operator of a plurality of freight operators. The network computer system can record the current location of each of the plurality of freight operators in a data store of the set of memory resources. Additionally, the network computer system can repeatedly query the data store to determine when at least two freight operators of the plurality of freight operators that satisfy a set of drafting conditions. The set of drafting conditions including a proximity condition as between the at least two freight operators and a candidate commencement location. In response to the determination, the network computer system can implement a drafting arrangement between the at least two freight operators.

20 Claims, 9 Drawing Sheets

US 11,760,352 B2

Page 2

Related U.S. Application Data

(60) Provisional application No. 62/815,925, filed on Mar. 8, 2019.

(51) Int. Cl.
 G06Q 10/08 (2023.01)
 G06Q 10/0835 (2023.01)

(56) References Cited

U.S. PATENT DOCUMENTS

| | | |
|---|---|---|
| 6,456,207 B1 | 9/2002 | Yen |
| 6,516,056 B1 | 2/2003 | Justice et al. |
| 6,591,253 B1 | 7/2003 | Dinkin et al. |
| 6,879,962 B1 | 4/2005 | Smith et al. |
| 7,315,780 B2 | 1/2008 | Sugahara et al. |
| 7,353,181 B2 | 4/2008 | Nel |
| 7,385,529 B2 | 6/2008 | Hersh et al. |
| 7,552,063 B1 | 6/2009 | McEachern |
| 7,561,069 B2 | 7/2009 | Horstmeyer |
| 8,131,307 B2 | 3/2012 | Lubeck et al. |
| 8,271,316 B2 | 9/2012 | Blackshaw et al. |
| 9,135,803 B1 | 9/2015 | Fields et al. |
| 9,478,150 B1 | 10/2016 | Fields et al. |
| 9,908,530 B1 | 3/2018 | Fields et al. |
| 9,921,070 B1 | 3/2018 | Nimchuck et al. |
| 9,955,326 B2 | 4/2018 | Avrahami et al. |
| 2002/0034292 A1 | 3/2002 | Tuoriniemi et al. |
| 2002/0065738 A1 | 5/2002 | Pragelas et al. |
| 2002/0095308 A1 | 7/2002 | Trauth et al. |
| 2002/0138338 A1 | 9/2002 | Banerjee et al. |
| 2002/0188517 A1 | 12/2002 | Furuya et al. |
| 2002/0194129 A1 | 12/2002 | Mezhvinsky et al. |
| 2003/0087648 A1 | 5/2003 | Jones |
| 2003/0233190 A1 | 12/2003 | Ki |
| 2004/0106399 A1 | 6/2004 | Jun |
| 2004/0112959 A1 | 6/2004 | Faith |
| 2004/0158483 A1 | 8/2004 | Fenner et al. |
| 2004/0219933 A1 | 11/2004 | Laurent et al. |
| 2004/0249699 A1 | 12/2004 | Isaac |
| 2004/0249818 A1 | 12/2004 | Rast |
| 2004/0260470 A1 | 12/2004 | LeCouturier |
| 2005/0149382 A1 | 7/2005 | Ferra et al. |
| 2005/0227704 A1 | 10/2005 | Hersh et al. |
| 2005/0278063 A1 | 12/2005 | Hersh et al. |
| 2006/0059023 A1 | 3/2006 | Greenstein |
| 2006/0136254 A1 | 6/2006 | Raney |
| 2006/0155460 A1 | 7/2006 | Raney |
| 2006/0200306 A1 | 9/2006 | Satterfield |
| 2006/0200396 A1 | 9/2006 | Crady et al. |
| 2006/0217885 A1 | 9/2006 | Milleville |
| 2007/0103342 A1 | 5/2007 | Wallace |
| 2008/0086322 A1 | 4/2008 | Pavlov |
| 2008/0114629 A1 | 5/2008 | Sprigg |
| 2008/0125967 A1 | 5/2008 | Sprigg |
| 2008/0140597 A1 | 6/2008 | Satir et al. |
| 2008/0158016 A1 | 7/2008 | Wang et al. |
| 2008/0189207 A1 | 8/2008 | O'Sullivan |
| 2008/0195428 A1 | 8/2008 | Anderson et al. |
| 2008/0270019 A1 | 10/2008 | Poykko et al. |
| 2008/0270204 A1 | 10/2008 | Bharadwaj et al. |
| 2008/0312991 A1 | 12/2008 | Jani et al. |
| 2009/0037095 A1 | 2/2009 | Marcinkiewicz et al. |
| 2009/0049119 A1 | 2/2009 | Carr |
| 2009/0083111 A1 | 3/2009 | Salemme et al. |
| 2009/0099971 A1 | 4/2009 | Dicke |
| 2009/0125228 A1 | 5/2009 | Doinoff et al. |
| 2009/0177502 A1 | 7/2009 | Hill |
| 2009/0216600 A1 | 8/2009 | McEachern |
| 2009/0222284 A1 | 9/2009 | Yu |
| 2009/0254270 A1 | 10/2009 | Wheeler |
| 2009/0313077 A1 | 12/2009 | Carlson |
| 2010/0017275 A1 | 1/2010 | Kenedy et al. |
| 2010/0076988 A1 | 3/2010 | Golla |
| 2010/0243724 A1 | 9/2010 | Audet |
| 2011/0010300 A1 | 1/2011 | Fox et al. |
| 2011/0099040 A1 | 4/2011 | Meyer et al. |
| 2011/0060600 A1 | 5/2011 | Felt et al. |
| 2011/0137696 A1 | 6/2011 | Dixon et al. |
| 2011/0153495 A1 | 6/2011 | Islam et al. |
| 2012/0130627 A1 | 5/2012 | Erdal |
| 2012/0179764 A1 | 7/2012 | Davidson |
| 2012/0253548 A1 | 10/2012 | Davidson |
| 2013/0030873 A1 | 1/2013 | Spires |
| 2013/0041720 A1 | 2/2013 | Kriss |
| 2013/0245991 A1 | 9/2013 | Hanson et al. |
| 2013/0335193 A1 | 12/2013 | Christie et al. |
| 2014/0122147 A1 | 5/2014 | Wippler |
| 2014/0200804 A1 | 7/2014 | Ranganathan et al. |
| 2014/0229399 A1 | 8/2014 | Krivacic et al. |
| 2014/0249742 A1 | 9/2014 | Depura et al. |
| 2014/0324633 A1 | 10/2014 | Mitchell et al. |
| 2014/0330596 A1 | 11/2014 | Ikawa |
| 2015/0006428 A1 | 1/2015 | Medina et al. |
| 2015/0081162 A1 | 3/2015 | Ochsendorf et al. |
| 2015/0088581 A1 | 3/2015 | Jones et al. |
| 2016/0042303 A1 | 2/2016 | Wippler |
| 2016/0047646 A1 | 2/2016 | Scharaswak et al. |
| 2016/0104111 A1 | 4/2016 | Mason et al. |
| 2016/0202069 A1 | 7/2016 | Jones et al. |
| 2016/0300186 A1 | 10/2016 | Serjeantson et al. |
| 2016/0334236 A1 | 11/2016 | Khan |
| 2017/0046658 A1 | 2/2017 | Memani et al. |
| 2017/0109696 A1 | 4/2017 | Marueli |
| 2017/0124506 A1 | 5/2017 | Pillai et al. |
| 2017/0144671 A1 | 5/2017 | Boye et al. |
| 2017/0249847 A1 | 8/2017 | Berdinis et al. |
| 2018/0068269 A1 | 3/2018 | Berdinis et al. |
| 2018/0096300 A1 | 4/2018 | Rakah et al. |
| 2018/0211217 A1 | 7/2018 | Pike et al. |
| 2018/0211218 A1 | 7/2018 | Madrigal et al. |
| 2018/0211541 A1 | 7/2018 | Madrigal et al. |
| 2019/0095859 A1 | 3/2019 | Arena |
| 2019/0118825 A1 | 4/2019 | Donnelly et al. |
| 2019/0122551 A1 | 4/2019 | Madrigal et al. |
| 2019/0130351 A1 | 5/2019 | Driegert et al. |
| 2019/0213529 A1 | 7/2019 | Chang et al. |
| 2019/0232967 A1 | 8/2019 | Tuoriniemi et al. |
| 2019/0318298 A1 | 10/2019 | Pragelas et al. |
| 2019/0385119 A1 | 12/2019 | Trauth et al. |
| 2020/0027348 A1 | 1/2020 | Madrigal et al. |
| 2020/0080853 A1 | 3/2020 | Tam et al. |
| 2020/0242932 A1 | 7/2020 | Madrigal et al. |

FOREIGN PATENT DOCUMENTS

| | | |
|---|---|---|
| CN | 103761635 | 4/2014 |
| CN | 103870893 | 6/2014 |
| CN | 105069594 | 11/2015 |
| EP | 2827289 | 1/2015 |
| JP | 2002123887 | 4/2002 |
| JP | 2006323784 | 11/2006 |
| JP | 2017165509 | 9/2017 |
| KR | 1020170026805 | 3/2017 |
| NL | 2017377 | 3/2018 |
| WO | WO 1995/027964 | 10/1995 |
| WO | WO 2016/0133594 | 8/2016 |
| WO | WO 2017/0025955 | 2/2017 |
| WO | WO 2017/0107854 | 6/2017 |
| WO | WO 2018/0106730 | 6/2018 |
| WO | WO 2018/0107046 | 6/2018 |
| WO | WO 2018/0136179 | 7/2018 |

OTHER PUBLICATIONS

Bishop, "The Three Streams of Truck Platooning Development", Linkedin, 2018.
Chaiken, "How Platooning Trucks Use LTE Communications", Peloton Technology, 2018.
Clevenger, "Omnitracs, Peloton Forge Platooning Alliance", Transport Topics, Feb. 16, 2017.
Dougherty, "Self-Driving Trucks May be Closer Than They Appear", The New York Times, Nov. 13, 2017.

(56) References Cited

OTHER PUBLICATIONS

Extended European Search Report for EP 10835261.8 dated Oct. 10, 2016.
Examination Report for AU 2010325793, dated Jun. 21, 2013.
Examination Report No. 2 for AU 2015202596 dated May 22, 2017.
Fleet Owner, "Peloton Cummins, Peterbilt, ZF join Purdue Univ. to launch demonstration program in March", Technology, Nov. 15, 2016.
Graham, "Omnitracs Partners with Peloton Technology on Driver-Assistive Truck Platooning and Development of Combined Fleet Management Solutions", Business Wire, Feb. 16, 2017.
Gross, "What Trucks Can Learn from Bicycles", The Juice, Jun. 8, 2015.
Haden, "Driverless Vehicles May Someday Transform the Trucking Industry, But Platooning Can do That Today", LinkedIn, Feb. 28, 2019.
Halsey, Are those 80,000 pound trucks tailgating each other? Soon it may be perfectly normal—and safe, The Washington Post, Oct. 22, 2017.
Hogle, "Peloton Platooning Solution Headed to Cooper Hewitt", Smithsonian Design Museum, Peloton Technology, 2018.
Hsu, "Trucking Experts Say Platooning is Near—Cross-Carrier Partnerships, Data Sharing, Trucks.com", May 4, 2017.
Hunt, J.B. "Find a Load, Make an Offer with Carrier 360: Watch the Video, https://www.jbhunt.com/blog/2017/10/25/ carrier-360-video", Oct. 25, 2017.
Hunt, J.B., "Booking & Dispatching Loads https:// www.jbhunt.com/blog/2018/05/22/carrier- 360-dispatching-freight/", May 22, 2018.
Hunt, J.B., "Carrier 360 Introduces I'm Not Driving Mode, https://jbhunt.com/blog/2019/06/03/ carrier-360-introduces-im-not-driving-mde/", Jun. 3, 2019.
Hunt, J.B., "Carrier 360 Tutorial: Creating Favorite Lanes [Video] https://jbhunt.com/blog/2018/04/13/carrier-360-favorite-lanes/", Apr. 13, 2018.
Hunt, J.B., "Carrier 360 Tutorial: Load Board Features [Video], https://www.jbhunt.com/blog/2018/03/01/360-load-board-features", Mar. 1, 2018.
Hunt, J.B., "Eight Things you can do using your J.B. hunt 360 account, https://www.jbhunt.com/blog/2017/06/13/jbhunt-360", Jun. 13, 2017.
Hunt, J.B., "Get your next load recommendation from J.B. Hunt 360, https://www.jbhunt.com/blog/2017/08/02/360-load-recs/", Aug. 2, 2017.
Hunt, J.B., "Loads Delivered to You: Three Ways to Find Loads Using Carrier 360 by J.B. Hunt, https://www.jbhunt.com/blog/2017/09/28/find-loads- carrier-360/", Sep. 28, 2017.
Hunt, J.B., "Simpler is Better: Easy check calls and automated detention, https://www.jbhunt.com/blog/2018/11/19/check-calls-detention-carrier-360", Nov. 19, 2018.
International Preliminary Report on Patentability for PCT/US2019/036622, dated Aug. 4, 2020.
International Search Report and Written Opinion PCT/US2018/057538 for dated Jan. 25, 2019.
International Search Report and Written Opinion for PCT/US2019/012516 dated Apr. 24, 2019.

Kuebix, "White Paper, Effectively Managing Big Data in Your Supply Chain: How to lake action now that will ensure success in the figure", Aug. 22, 2017.
Lockwood, "Truck Platooning, Past, Present and Future", HDT Truckinginfo, Fuel Smarts, Apr. 8, 2016.
Loo, "What It's Like to Be in the Peloton Driver's Seat, Peloton Technology", 2018.
Luckevich, "V2V Communication in Platooning, Peloton Technology", 2018.
Martinez, "Trucks flirt with driverless features", The Detroit News, Jun. 29, 2015.
Nakano, "Here's What we mean by putting safety first", Peloton Technology, 2018.
Peloton, "Industry Report: Platooning systems such as from Peloton offer significant fuel efficiency & safety gains", North American Council on Freight Efficiency and Carbon War Room, Oct. 4, 2016.
Peloton, "Majority of US freight ton miles now occur in platooning approved states", Peloton Technology, 2018.
Peloton, "Peloton applauds Michigan for national leadership in advancing truck safety and efficiency with deployment of driver-assistive commercial truck platooning", Peloton Technology, 2018.
Peloton, "Peloton Technology demonstrates driver-assistive truck platooning system to Florida transportation leaders in connection with Florida pilot project", Peloton Technology, Dec. 20, 2017.
Peloton, "Peloton Technology demonstrates driver-assistive truck platooning system to Michigan Officials on Path to Commercial Deployment", Peloton Technology, Dec. 4, 2017.
Peloton, "Platooning combines advanced technology to improve safety and fuel efficiency", Media—Paloton Technology/ Truck Platooning and Automation, 2018.
Peloton, "The Peloton System enables teams of professional drivers to save fuel by drafting safely", Peloton Technology 2018.
Prince, et al., "The Dreamers: Six Innovators Hoping to Revolutionize the Auto Industry, Forever, Road and Track", Dec. 1, 2017.
Reiskin, "Panelists Say Driverless Trucks Decades Away; Platooning Pairs Coming in 2017, Transport Topics", Oct. 6, 2016.
Roberts, "Truck Platooning to Become Reality This Year, HOT Truckinginfo", Fuel Smarts, Apr. 13, 2017.
Round et al., "Future Ride: Adopting New Technologies to Paratransit in the United States", Working Paper, UCTC No. 306, University of California Transportation Center, 51 pages.
European Search Report for EP 10835261.8 dated Oct. 1, 2013.
Shigemitsu et al. "AVM System", Fujistu Ten Technical Journel No. 33, 27:34, (2009).
Smartt, "The Peloton Cloud: Key to Platooning Safety, Efficiency & Control", Peloton Technology, 2018.
Staff, "Wabco Partnerships Aimed at Advancing Autonomous Vehicle Tech", HOT Truckinginfo, Fleet Management, Sep. 22, 2016.
Straight, "Peloton set to debut truck platoons later this year", Freight Waves, May 2, 2017.
Tingley, "How to Make Cars Cooperate", The New York Times, Nov. 9, 2017.
Written Opinion for PCT/US2019/012516 dated Oct. 11, 2019.
Zurschrneide, "Peloton's tech lets truckers play follow the leader to boost fuel economy", Cars, Digital Trends, Jan. 14, 2019.

\* cited by examiner

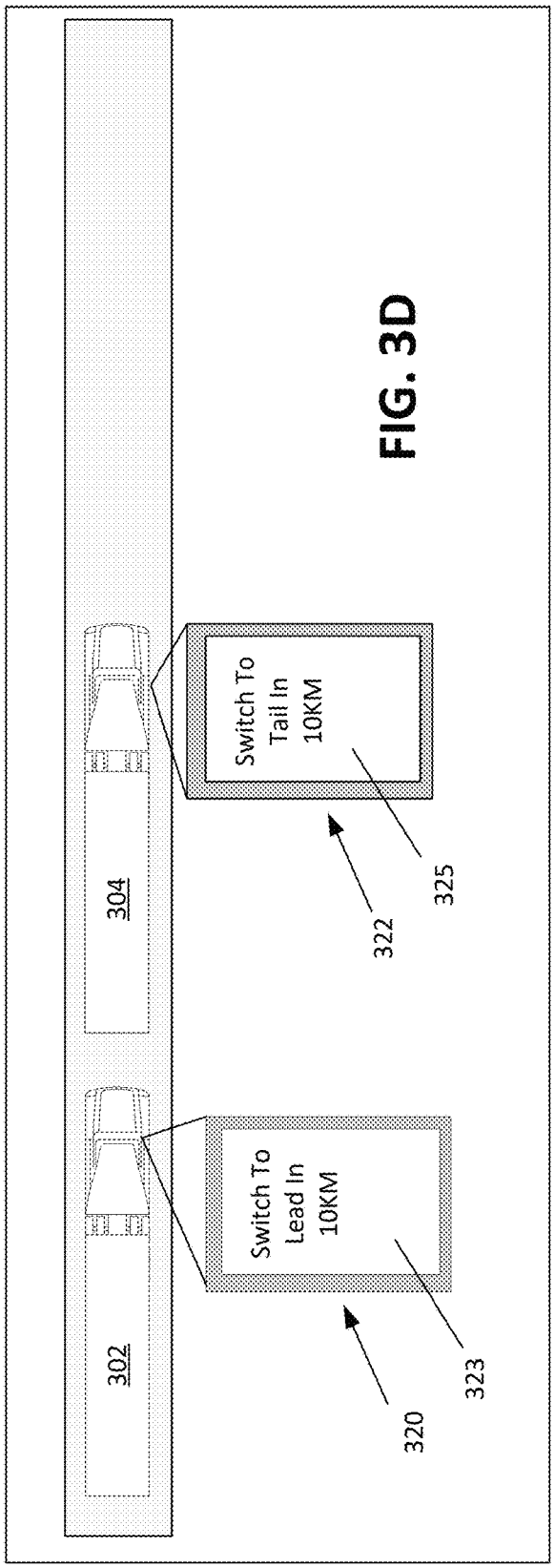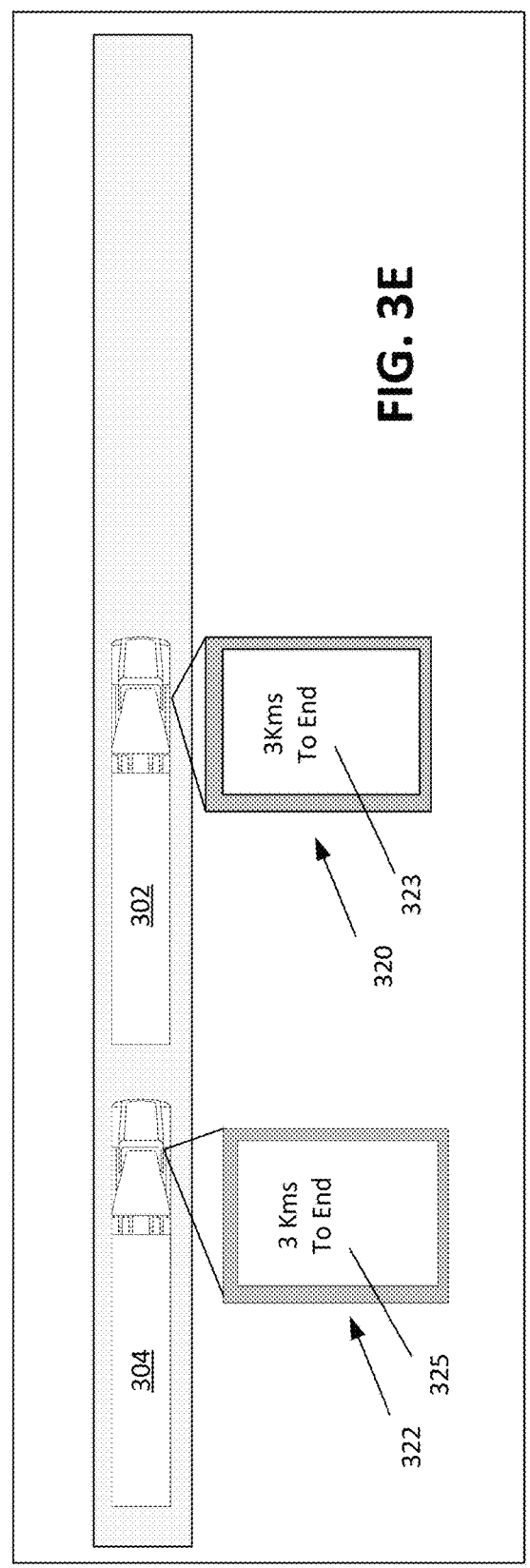

NETWORK COMPUTER SYSTEM TO CONTROL FREIGHT VEHICLE OPERATION CONFIGURATIONS

CROSS-REFERENCE TO RELATED APPLICATIONS

This application is a continuation of U.S. patent application Ser. No. 16/374,317, filed Apr. 3, 2019, which application claims the benefit of U.S. Provisional Patent Application No. 62/815,925, filed Mar. 18, 2019; the aforementioned applications being hereby incorporated by reference in their entirety.

FIELD OF INVENTION

Examples pertain to a network computer system to control freight vehicle operation configurations.

BACKGROUND

Drafting, sometimes referred to as platooning or slipstreaming, is a common technique that can be used by vehicles of different types to reduce air resistance or drag. In the context of freight vehicles, drafting occurs when one freight vehicle closely trails another freight vehicle on a roadway. In such an arrangement, the movement of a first freight vehicle creates a slipstream with a low-pressure zone that is positioned behind the vehicle, allowing a second vehicle to trail in the low-pressure zone of the first vehicle to reduce air drag.

BRIEF DESCRIPTION OF THE DRAWINGS

FIG. 3A through FIG. 3E illustrate sample user interfaces that are displayed to freight operators, in connection with a network computer system implementing a drafting arrangement between the freight operators;

Figure 1:
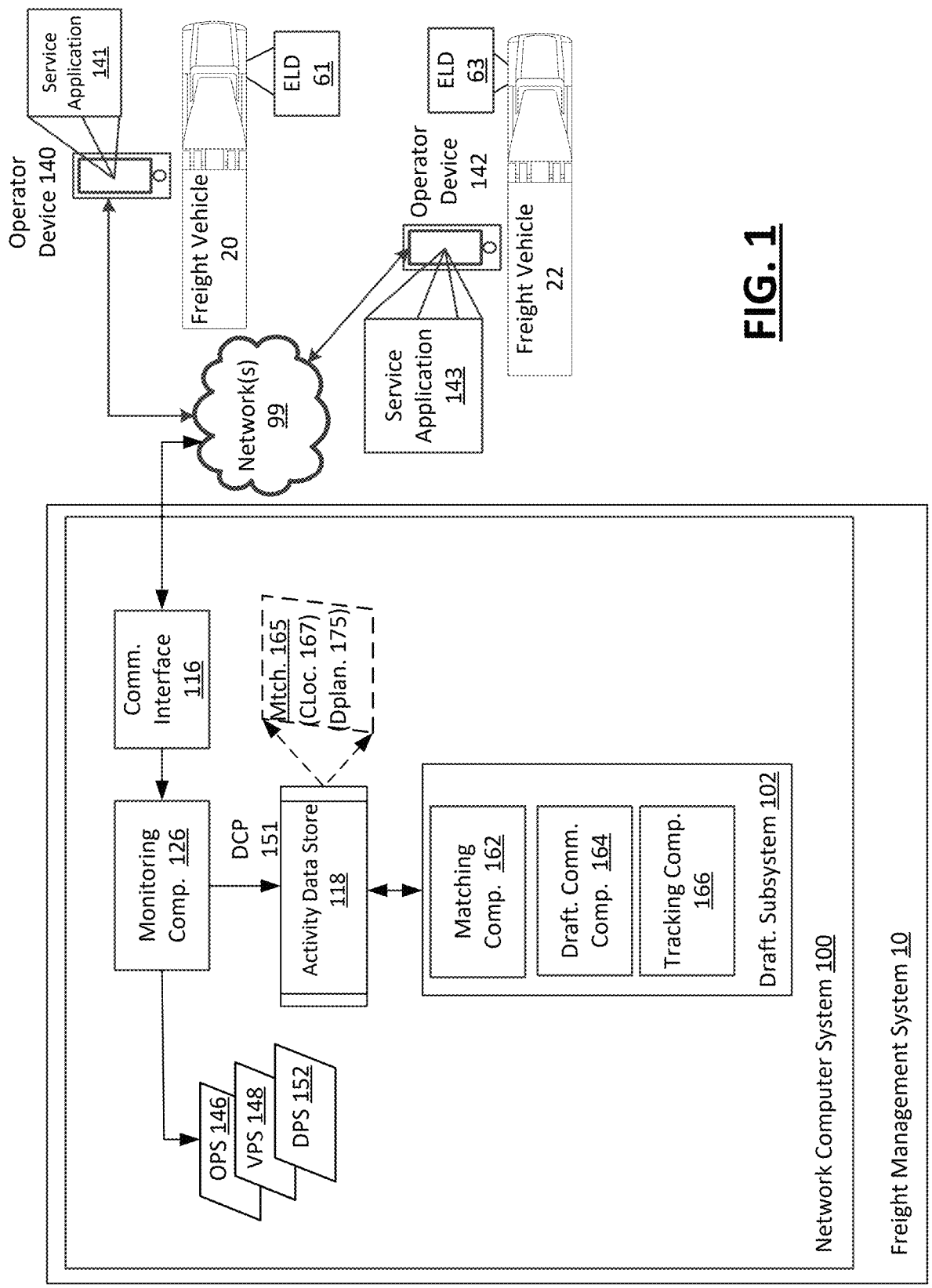
FIG. 1 illustrates an example network computer system to determine drafting arrangements between two or more freight operators.

Throughout the drawings, identical reference numbers designate similar, but not necessarily identical elements. The figures are not necessarily to scale, and the size of some parts may be exaggerated to more clearly illustrate the example shown. Moreover, the drawings provide examples and/or implementations consistent with the description. However, the description is not limited to the examples and/or implementations provided in the drawings.

DETAILED DESCRIPTION

Drafting, sometimes referred to as platooning or slipstreaming, is a common technique that can be used by vehicles of different types to reduce air resistance or drag. In the context of freight vehicles, drafting occurs when one freight vehicle closely trails another freight vehicle on a roadway. In such an arrangement, the movement of a first freight vehicle creates a slipstream with a low-pressure zone that is positioned behind the vehicle, allowing a second vehicle to trail in the low-pressure zone of the first vehicle to reduce air drag.

Drafting has, until recent times, been viewed as a technique which skilled operators could exploit to save energy, and specifically in context of competitive automobile, motorcycle and bicycle racing. But with increasing efforts directed to fuel conservation, efforts have been made to safely exploit the benefits of drafting to the operation of freight vehicles. Experimental results have shown, for example, that drafting can save freight vehicles between 10-40% on fuel. But drafting amongst freight operators has also raised safety concerns, as the reaction time required from the trailing vehicle to react to sudden movements of the lead vehicle leaves little margin for error.

Freight vehicles are increasingly equipped with sensors and other technological advancements which have made drafting safer. Among such advances, some freight vehicles are equipped with sensors that detect unexpected encroachment by objects within just a few feet (e.g., 6 feet), and such systems can sound a notification alarm for the freight operator or implement speed reduction automatically until the freight operator acts. Still further, other technological advancements include intra-vehicle communication and control systems which can synchronize the acceleration and braking actions performed on two freight vehicles. In such systems, when the lead freight vehicle brakes, the trailing freight vehicle brakes automatically at the same time. These and other technological advancements have alleviated some of the concerns about safety with respect to the operation of freight vehicles.

While technological advancements have been made to promote safety in drafting arrangements, such advancements do not address many logistic problems which prevent drafting from being safely employed on a widespread basis. As an example, an increasing number of freight vehicles are owned and operated by the freight vehicle's operator, as opposed to carriers who operate fleets of freight vehicles. As a result, a substantial portion of active freight operators are not centrally managed, making the ability for freight operators to coordinate, let alone communicate directly is limited. Examples recognize that the absence of coordination and communication amongst freight operators significantly limits the able of freight operators to draft with one another. For freight operators to find drafting arrangements, the freight operator must identify another freight operator who is in proximity, having a shared route. To find a drafting arrangement, the freight operator may have to repeatedly raise inquiries through a freight vehicle's communication system, or post messages on online forums indicating their planned route or future location. In such scenarios, the freight operator has to balance the inconvenience and cost of finding a drafting arrangement (e.g., downtime waiting for other freight vehicle) with the benefits that drafting can bring.

Additionally, under conventional approaches, when drafting takes place, the lack of communication and coordination between freight operators can result in downtime amongst freight operators and lost fuel-efficiency. For example, while two freight operators can communicate to arrange for drafting with one another, better drafting arrangements may have been available to each freight operator. For example, the freight operator of the drafting arrangement may have been able to form drafting arrangements with other freight operators who were closer and/or who had a more compatible route or schedule to permit longer drafting durations.

Moreover, the actions freight operators may have to perform to arrange drafting with other freight operators can itself be a distraction that raises safety issues. For example, to arrange drafting, freight operators may have to manually operate mobile devices to find and communicate with other freight operators, and when drafting arrangements are made, freight operators have to seek out and locate the other freight operator at agreed upon locations.

Among other benefits, examples provide for a network computer system that monitors active freight operators to determine and implement drafting arrangements amongst two or more freight operators. The network computer system can select and configure drafting arrangements to further objectives, such as objectives of matching freight operators to maximize the drafting time, and/or an objective to reduce wait time, route deviations and/or other cost considerations, to each or both freight operators.

Moreover, in examples, a network computer system implements processes to facilitate coordination amongst the freight operators when drafting is commenced. For example, the network computer system can locate a commencement location for the drafting arrangement that furthers the objectives of increasing drafting time and/or fuel efficiency to each freight operator of the drafting arrangement, while reducing wait time and/or costs to the freight operators.

Additionally, in examples, a network computer system implements processes to facilitate coordination amongst the freight operators when drafting is taking place. According to examples, a network computer system can coordinate when freight operators switch drafting positions, or when drafting is complete, to avoid or lessen, for example, interactions amongst the freight operators which can reduce the efficiency and/or safety of the drafting arrangement, by mitigating or avoiding discussion time amongst the freight operators to implement the drafting arrangement.

With examples described, a network computer system can be implemented as, or otherwise utilize, a distributed computing system, where freight operator devices can be controlled and/or triggered to execute processes for implementing drafting arrangements, as described. In examples, a network computer system includes, or otherwise utilizes devices located on freight vehicles (e.g., mobile devices of freight operators) to acquire information and/or display content, for purpose of implementing drafting arrangements in accordance with one or more objectives.

According to examples, a network computer system can make drafting arrangement recommendations or instructions between two or more freight operators (or freight vehicles). As described herein, drafting refers to a technique in which one vehicle can reduce drag (e.g., via wind resistance) by driving in close proximity behind another vehicle. The network computer system can implement a drafting configuration process to determine drafting arrangements between two or more vehicles (e.g., identifying two or more freight operators or freight vehicles to participate in a drafting arrangement). In various implementations, the network computer system implements the drafting configuration process by utilizing a variety of parameters, including (i) drafting configuration parameters, which identify information for individual freight operators of a freight service (e.g., location information of an individual freight operator that indicates a current location of the individual freight operator), and (ii) projected drafting-related parameters, which include projections related to the freight operator joining or otherwise being included in a drafting arrangement (e.g., expected outcome for an individual freight operator).

In some examples, at least some of the parameters used for the drafting configuration process can be weighted with respect to one another so that some parameters are of higher priority than other parameters. Additionally, some parameters may be determinative of an outcome or result of one or more stages of the implemented drafting arrangements. For example, a projected draft-related parameter may be based on a distance of a candidate freight operator to another freight operator, or to a group of freight operators who are already matched for drafting (and/or already drafting). If the distance of the candidate freight operator exceeds a threshold (e.g., dynamically determined threshold based on the candidate freight operator's next stop), then the projected draft-related parameter may be determinative in that the candidate freight operator may not be selected for a drafting arrangement.

In determining a configuration for a drafting arrangement, the network computer system can make a drafting position determination for each freight operator of a determined drafting group of freight operators. For a group of two freight operators, the position determination may identify the lead and the follower for a duration of time (the amount of time the two freight operators can draft along a route of travel in that particular configuration). In some examples, the drafting group can include three or more freight operators, in which case the position determination can identify which of a respective three or more drafting positions are to be occupied by individual freight operators of the group. Still further, in one example, the drafting arrangement determined by the network computer system can specify that after a determined amount of time, the freight operators can switch positions (e.g., switch from leading to following, or vice versa). In such an example, the network computer system can make multiple drafting position determinations for each freight operator of the drafting group for multiple durations of time.

As provided herein, the terms "driver," "operator," "freight operator" and "service provider" are used throughout this application interchangeably to describe a person utilizing an application (e.g., a provider or carrier client or web application) on a computing device to drive, transport people or items, and/or provide freight services to a freight service requester (e.g., a shipper). The terms "requester, and "a freight service requester" can be a person or group of people who utilize an application (e.g., a requester or shipper client or web application) on a computing device to request, over one or more networks, services, such as transport or freight services from a network computing system.

One or more examples described herein provide that methods, techniques, and actions performed by a computing device are performed programmatically, or as a computer-implemented method. Programmatically, as used, means through the use of code or computer-executable instructions. These instructions can be stored in one or more memory resources of the computing device. A programmatically performed step may or may not be automatic.

Additionally, one or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs, or machines.

Moreover, examples described herein can generally require the use of specialized computing devices, including processing and memory resources. For example, one or more examples described may be implemented, in whole or in part, on computing devices such as servers, desktop computers, cellular or smartphones, personal digital assistants (e.g., PDAs), laptop computers, printers, digital picture frames, network equipment (e.g., routers), wearable computing devices, and tablet devices. Memory, processing, and network resources may all be used in connection with the establishment, use, or performance of any example described herein (including with the performance of any method or with the implementation of any system). For instance, a computing device coupled to a data storage device storing the computer program and configured to execute the program corresponds to a special-purpose computing device. Furthermore, any computing systems referred to in the specification may include a single processor or may be architectures employing multiple processor designs for increased computing capability.

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples described can be carried and/or executed. In particular, the numerous machines shown with examples described include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

Alternatively, one or more examples described herein may be implemented through the use of dedicated hardware logic circuits that are comprised of an interconnection of logic gates. Such circuits are typically designed using a hardware description language (HDL), such as Verilog and VHDL. These languages contain instructions that ultimately define the layout of the circuit. However, once the circuit is fabricated, there are no instructions. All the processing is performed by interconnected gates.

System Description

FIG. 1 illustrates an example network computer system to determine drafting arrangements between two or more freight operators. Network computer system 100 can be implemented as part of a freight management system 10, where, for example, freight operators are assigned to shipments, receive routing information and/or other instructions or guidance for completing their respective routes or tasks. In context of a freight management system, network computer system 100 can includes processes for implementing drafting arrangements between two or more freight operators.

With respect to examples as described, the network computer system 100 can be implemented on a server, on a combination of servers, and/or on a distributed set of computing devices which communicate over a network such as the Internet. Still further, some examples provide for the network computing system 100 to be distributed using one or more servers and/or mobile devices. In some variations, the network computing system 100 is implemented as part of, or in connection with a freight management service for individual freight operators, wherein individual freight operators use respective mobile devices (or other freight operator devices) that they own or operate to receive and/or participate in the freight management service. While some examples are described where the network computer system 100 is integrated with the freight management system 10, in variations, the network computer system 100 can operate as a separate service to implement drafting arrangements between participating freight operators and/or carriers.

Over a given territory, the network computer system 100 communicates with numerous mobile computing devices, such as operator device 140 and 142 that are carried by freight operators within corresponding freight vehicles 20, 22. In some examples, each freight vehicle 20, 22 includes a truck (or tractor) and trailer, with the trailer being separable from the truck. In variations, each freight vehicle 20, 22 can correspond to any vehicle that is capable of carrying a shipment load. By way of example, freight vehicles can include tractor units (sometimes referred as to as "semis" or "semi-tractors"), flatbed trucks, cargo vans, box trucks, and numerous types of specialized trucks (e.g., tank trucks to carry flammable liquid, refrigerated trucks, etc.).

In some examples, the mobile devices 140, 142 execute respective service applications 141, 143, to enable the freight operators to receive services and other functionality from the network computer system 100. In some examples, the mobile devices 140, 142 correspond to multi-functional messaging and/or telephony device of the freight operator (e.g., feature phone, smart phone, phablet, tablet, ultramobile computing device, etc.). In variations, individual mobile devices 140, 142 implement respective service applications 141, 143 which communicate with the network computer system 100. In communicating with the network computer system 100, the mobile devices 140, 142 may access geo-aware resources of the computing device, such as a respective satellite receiver (e.g., Global Positioning System ("GPS") receiver) which determines longitude and latitude of the respective mobile device over repeated intervals. The individual mobile devices 140, 142 may also execute the service applications 141, 143 to access other types of data, such as sensor data obtained from an accelerometer, gyroscope, inertial mass unit ("IMU") or other type of sensor device. Through execution of the service applications 141, 143, the respective mobile devices 140, 142, can be triggered or otherwise enabled to sample sensors and location-aware sensors (e.g., satellite receiver), and to transmit the sampled information to the network computer system 100. For example, mobile devices 140, 142 can be used to repeatedly transmit the current location of the freight vehicle while the freight operator is on-duty.

As an addition or variation, the mobile devices 140, 142 can also execute the service applications 141, 143 to transmit, for example, a current service plan (e.g., shipments in progress, shipments which the freight operator may be picking up) or other related information, to identify, for example, a trip destination for the freight vehicle, a desired or expected time of arrival at the trip destination, a freight status (e.g., empty, partially full, full) and/or a current or expected route. As an alternative or variation, the monitoring component 126 can receive information corresponding to a freight operator's service plan or other related information from the freight management system 10.

Still further, in other variations, the service applications 141, 143 can also serve as an interface to provide the network computer system 100 with information determined from one or more types of vehicle resources. The service applications 141, 143 can communicate with the electronic logging devices ("ELD") 61, 63 of corresponding freight vehicles 20, 22 using, for example, a local wireless link (e.g., via Bluetooth) or wireline connection, to obtain vehicle information (e.g., on-board diagnostic ("OBD") information, vehicle operational information, etc.). In similar fashion, the service applications 141, 143 can also communicate with other types of vehicle resources, such as sensors on the freight vehicle (e.g., tire sensors) or provided with the trailer (e.g., weight sensors, cameras). In this way, the service applications 141, 143 can execute on the respective mobile devices 140, 142, to retrieve information from vehicle resources, and to communicate corresponding vehicle information to the network computer system 100. In other variations, the service applications 141, 143, can also access, for example, applications and/or application data sources (e.g., third-party applications and services), in order to perform other tasks in connection with data received from the network computer system 100.

The network computer system 100 can programmatically monitor freight operators (or freight vehicles) that are active (e.g., currently transporting a shipment in furtherance of a shipping request) in operating freight vehicles 20, 22 over a given geographical region. In examples, the individual operator devices 140, 142 execute the corresponding service applications 141, 143 that cause the respective mobile devices to operate as information inlets and/or outlets for the network computer system 100. As an information inlet, the operator devices 140, 142 can also transmit freight activity information 52 to the network computer system 100, using the one or more wireless networks 99 (e.g., cellular networks). The freight activity information 52 can include sensor information obtained from the respective service application, including location information for the respective freight vehicle 20, 22. In this way, the network computer system 100 can use the freight activity information 52, as transmitted from operator devices 140, 142, to track respective freight vehicles 20, 22, including to determine and update the current or recent location of individual freight vehicles over a given geographical region.

As described with some examples, the network computer system 100 can further detect and track activities of individual freight operators using the freight activity information 52. For example, the operator devices 24 can detect and record, via the respective service applications 141, 143, interactions of the individual freight operators with respect to communications of the freight management system 10. With respect to freight activities conducted through the freight management system 10, the operator devices 140, 142 can detect and record, using sensor data (e.g., location information) and/or other information, the occurrence of predefined events, such as the freight operator completing, or nearing completion of a shipping request.

In some examples, the freight activity information 52 can include logging information from corresponding freight vehicles 20, 22. The logging information may be obtained from, for example, the operator devices 140, 142, or alternatively from a resident ELD 61, 63 of individual freight vehicles 20, 22. The logging information may identify, for example, information about the operation of the corresponding freight vehicle 20, 22, such as information from which fuel efficiency can be determined. As an addition or variation, the logging information may identify a continuous interval during which the freight vehicle was in operation. Such information may be used to monitor the number of hours during which a freight operator has continuously operated a freight vehicle. When used in connection with the freight management system 10, the network computer system 100 can track shipping requests which are assigned to individual freight operators. In particular, the network computer system 100 can identify parametric information about a current shipping assignment which each freight operator is fulfilling, where the parametric information includes the shipment loading location, loading time (e.g., time interval when load is available for loading), delivery location, and delivery time (e.g., time interval when load is to be delivered at delivery location). For example, when a freight operator accepts a new shipment, the respective service application 141, 143 may automatically record information about the new shipment, in connection with a profile of the freight operator. In some variations, the service applications 141, 143 can execute to develop one or more profiles for the respective freight operator, and the profiles can persist on the respective mobile devices and/or system 100 as the freight operator operates different freight vehicles.

In variations, the network computer system 100 can operate as part of the freight management system 10 to determine the current route of the freight operator, and/or predict the route the freight operator will take to fulfill the current assignment. The network computer system 100 can further monitor the progress of each freight operator towards fulfilling the current shipping assignment, including recording the current and/or recent locations of the freight operator with respect to the planned route of the freight operator. The network computer system 100 can track freight operators by, for example, (i) recording new shipping requests that are assigned to each freight operator; (ii) detecting when the freight operator loads the corresponding shipment of each shipping request; (iii) tracking a location of each freight operator that is assigned to a shipping request as the freight operator travels to a shipment loading location, and/or to a shipment delivery location; and/or (iv) detecting when the freight operator unloads or otherwise completes a current shipping assignment. Over time, the network computer system 100 can use historical information for each freight operator, where the historical information can be maintained by one or more profile stores 146, 148, 152, as described by examples below. The historical information can include, for example, parametric information about completed shipping requests, including shipment loading locations, shipment delivery locations, and routes taken by the freight operator. The network computer system 100 can also determine preferences of the freight operators as to shipping requests, such as preferred shipment pickup and/or delivery locations of each freight operator. Still further, in variations, the network computer system 100 can infer preferences of the freight operator as to shipping requests, based on, for example, a home location of the freight operator.

In examples, the network computer system 100 includes a drafting subsystem 102, a communication interface 116, a monitoring component 126 and an activity data store 118. The drafting subsystem 102 includes processes to configure and implement drafting arrangements through different stages, including one or more of (i) a matching phase, where freight operators are identified as suitable candidates for drafting, (ii) a meetup phase, wherein freight operators are directed, or otherwise guided to a particular location where the drafting arrangement between the two freight operators can take place, and (iii) a monitoring phase, wherein an implemented drafting arrangement is monitored until termination or completion.

In examples, the communication interface 116 can communicate with the service applications 141, 143 to establish one or more communication channels with each of the corresponding freight operator devices 140, 142. For example, the communication interface 116 can use service applications executing on mobile devices of freight operators to establish secure sockets from which different types of mobile devices can communicate information, as well as receive services, while the corresponding freight operators operate their respective freight vehicles. The communication interface 116 can receive freight activity information 52, which can be stored with the activity data store 118. In examples, the communication interface 116 receives and stores information that is used for services of the freight management system 10 (e.g., assigning shipping requests to freight operators, tracking freight operators for fulfillment of freight requests, etc.), as well as for implementing drafting arrangements amongst freight operators.

In examples, the network computer system 100 can implement drafting services for freight operators that are subscribers, or otherwise users of a service provided by the network computer system 100. For example, the network computer system 100 can implement drafting services for freight operators who have associated accounts which are maintained by the network computer system 100, with each freight operator's account being linked to the respective service application 141, 143 running on the freight operator's device 140, 142.

Still further, the activity data store 118 can maintain updated information for a roster of freight operators that are eligible for drafting arrangements. The roster of eligible freight operators can include freight operators who have, for example, an account or profile associated with the network computer system 100, such as in connection with receiving freight management services from the freight management system 10. As an addition or alternative, the roster of eligible freight operators can include freight operators which have, for example, indicated an online status, through, for example, execution of a service application 141, 143 on a corresponding mobile device 140, 142. Still further, the roster of eligible freight operators can include those freight operators who are operating freight vehicles that are suitably equipped for drafting services. As described examples below, the activity data store 118 can associate an identifier of each eligible freight operator with parametric information, as provided by various examples described below.

The monitoring component 126 can include processes implemented by the network computer system 100, to monitor information provided by the freight operator mobile devices 140, 142 for specific types of information and events, as the freight operators drive their respective freight vehicles 20, 22. The monitoring component 126 can also process input or programmatic triggers generated from the freight operator devices 140, 142, to detect input reflecting specific types of events, such as events corresponding to when the freight operator goes online, the freight operator accepts a shipping assignment, or events where the monitoring component 126 receives specific information in connection with processes executing on the freight operator's mobile device. By way of example, the information recorded about individual freight operators can include identification of a route or destination of the freight operator's current trip, identification of a status of the freight operator (e.g., on trip to shipping pickup location or destination, driving deadhead, resting, etc.), information about the freight vehicle the freight operator is operating, information about the freight load the freight operator is carrying and/or information about the freight load the freight operator is carrying.

In examples, the monitoring component 126 can include processes that use freight activity information 52 received from the freight operator's mobile devices 140, 142 and/or the freight management system 10, to update a collection of records in the activity data store 118, where each record of the collection relates to a specific freight operator, carrier and/or freight vehicle. In connection with information received from the freight operator devices 140, 142 and/or the freight management system 10, the monitoring component 126 can implement different types of processes to detect and record parametric information reflecting multiple types of information, (termed "drafting configuration parameters 151").

In examples, the drafting configuration parameters (DCP) 151 include, (i) a current location, such as may be communicated by the respective service applications 141, 143 interfacing with the respective devices' GPS receiver; (ii) a speed or speed profile of the freight operator, which may be determined from mapping current location of the freight operator over time; (iii) a current acceleration or acceleration profile of the freight operator (e.g., as determined from the sensor information and/or mapping of the associated current location over time); (iv) a predicted/planned route or route segment, such as may be communicated by the freight management system 10, freight operator input, and/or the respective service applications 141, 143; (v) a scheduling constraint (e.g., a planned or required arrival time for a freight operator's next stop) or scheduling flexibility, such as may be communicated by the freight management system 10, the respective service application, and/or a third-party application or service (e.g., calendar or navigation application) executing on the freight operator device 140, 142; (vi) a fuel consumption rate, based on information recorded on the freight operator device and/or retrieved from the ELD 61, 63 on the corresponding freight vehicles 20, 22; and/or (vii) a status or characteristic of the freight load which the particular freight operator is carrying. The status or characteristic of the freight load may be communicated by the freight management system 10, or the respective service applications 141, 143 after the respective mobile devices 140, 142 are provided such information by the freight management system 10. In other variations, the status or characteristic of the freight load may be communicated by the respective service applications 141, 143 communicating with sensors of the freight vehicle and/or truck (e.g., tire sensors, cameras in truck, etc.).

In examples, the drafting configuration parameters 151 can also include information determined from historical or characteristic information (collectively "profile information") about a freight operator and/or freight vehicle. The network computer system 100 may include an operator profile store (OPS) 146 which identifies, for example, a preference or tendency of the freight operator in operating a freight vehicle, such as with respect to a vehicle speed which the freight operator drives a freight vehicle at, a preferred type of roadway and/or a preferred route that the freight operator may drive a freight vehicle on.

In variations, the network computer system 100 may also include a vehicle profile store (VPS) 148 to store information about the freight vehicle the operator is driving (or likely to be driving). The vehicle profile store 148 may identify, for example, a capability of the freight vehicle (e.g., type of roadway the freight vehicle can operate on), a size of the freight vehicle's trailer (by dimension, volume and/or weight) and/or a type of freight load the freight vehicle can haul, etc.). Still further, the network computer system 100 can include a drafting profile store (DPS) 152, which can identify information about the freight operator's preferences with respect to drafting. By way of example, the drafting profile store 152 can identify (i) a preference of the freight operator, for or against (or neutrality towards) drafting with other freight operators, (ii) a recency and/or frequency of the freight operator drafting via arrangements implemented by the network computer system 100, and/or (iii) historical information about prior drafting arrangements which were implemented for the freight operator. The historical drafting information can identify, for example, the drafting position of the freight operator in previously arranged drafting arrangements, as well as the duration of prior drafting arrangements, including duration which the freight operator spent at each drafting position. The drafting profile store 152 can also identify other information about the freight operator with respect to prior drafting arrangements, such as the freight operator's speed and/or the proximity of the freight operator to another freight vehicle that was participating in the drafting arrangement.

In examples, activity data store 118 can obtain vehicle operation information directly from the ELD 61, 63 coupled directly to an electronic computing unit (ECU) of a corresponding freight vehicle 20, 22. For example, activity data store 118 can obtain, over one or more network(s) 99 and from ELD 61, 63 vehicle operation information of respective freight vehicles 20, 22. As such, the activity data store 118 can include vehicle operation information (e.g., freight vehicle velocity, operational parameters of freight vehicle components, fuel or battery usage or levels, etc.) as communicated by (i) the operator's mobile device 140, 142, (ii) directly from respective ELD 61, 63 (or corresponding ECU), and/or (iii) from a third-party service which may receive and provide ELD information for freight vehicles 20, 22. Depending on implementation, the activity data store 118 can be populated with freight vehicle information, in real-time, at sampled intervals (e.g., once per minute) or via asynchronous or offline communications (e.g., once a day).

Additionally, as described with some examples, the monitoring component 126 can determine a drafting status of the freight operator. The drafting status can identify, for example, whether the freight operator is eligible as a candidate for a drafting arrangement based on, for example, a vehicle type of the freight operator, a route the freight operator is operating or traveling on, a preference of the freight operator (e.g., a freight operator may be ineligible if he indicates that he does not want to participate in drafting arrangements), and/or or skill level of the freight operator. The information recorded about each freight operator can be stored with the freight operator's record (or collection of records) in the activity data store 118.

In variations, at least some of the information recorded for each freight operator can be determined in-part by the freight operator's input. For example, the freight operator may identify (e.g., using the service application running on their respective device) the current destination of the freight operator's trip, as well as information about the freight vehicle or the freight load the freight operator is carrying. As an addition or alternative, at least some of the information recorded for each freight operator can be determined automatically, using, for example, programmatic processes, which may include processes executed through the service applications 141, 143. Still further, other information that can be recorded for each freight operator can be obtained from the freight management system 10. For example, programmatic components of the freight management system 10, which can operate either separately or as an integrated part of the network computer system 100, can be used to determine information such as the current route of the freight operator (e.g., based on an assigned shipment), the freight operator's freight vehicle, and information about the freight load being carried by the freight operator.

The drafting subsystem 102 can utilize information maintained by the activity data store 118 and/or the profile stores 146, 148, 152, as well as information communicated directly or in near real-time by the mobile devices 140, 142 of the freight operators, to implement drafting arrangements amongst two or more freight operators. In implementing drafting arrangements, the drafting subsystem 102 can include processes represented by matching component 162, to match pairs or groups (e.g., three or more) of freight operators for individual drafting arrangements. The drafting subsystem 102 can also include processes represented by draft commencement component 164, to guide matched freight operators to respective locations where the freight operator(s) can commence drafting, or otherwise participate in drafting arrangements with other freight operators. In variations, the drafting subsystem 102 can also include processes represented by tracking component 166, to track drafting arrangements until a point where the drafting arrangement is completed or otherwise terminated.

In examples, the matching component 162 can utilize information maintained by the activity data store 118 and/or the profile stores 146, 148, 152 to make a matching determination 165 which pairs or groups freight operators for drafting arrangements. Each matching determination 165 can be represented as a recorded data set that associates two or more freight operators by respective their identifiers (e.g., name, account identifier) to one or more commencement locations 167 where drafting has or is expected to be commenced. Additionally, the data set of the matching determination 165 can include information that is indicative of a drafting state. For example, when two freight operators are first matched, the matching determination 165 can associate a data set that includes identifiers of participating freight operators, a commencement location 167 (e.g., identified by a geographic coordinate, or multiple geographic coordinates), and a drafting state which identifies the respective freight operators as being on route to the commencement location. Once the freight operators commence drafting at the commencement location 167, the associated data set of the matching determination 165 can identify the drafting state as being in progress. As described in greater detail, the matching determination 165 can also be associated with information that indicates a planned or expected duration for the drafting arrangements, as well as the current or planned drafting state of each freight operator.

As described in greater detail, the matching component 162 can implement processes to rank and select freight operators for drafting arrangements, where the ranking and selection are based on furthering one or more objectives, such as objectives of (i) maximizing a drafting time of one or more individual freight operators, (ii) maximizing a drafting time of the freight operators of the drafting arrangement collectively, and/or (iii) matching the drafting time of all candidate freight operators who are available for drafting, in a given geographic region over a given time interval. In examples, the matching component 162 can repeatedly evaluate a pool of freight vehicles for possible matching determinations, where the evaluation includes, for example, (i) determining a likely commencement location for the possible drafting arrangement, (ii) determining a likely completion point for the possible drafting arrangement, and/or (iii) determining a likely cost for each drafting arrangement. In examples, the matching component 162 can determine the likely cost for possible drafting arrangements by determining (i) a likely route deviation which one or both freight operators may be required to make in order to implement the drafting arrangement, and/or (ii) a delay in each freight operator's current schedule in order to implement the drafting arrangements. Still further, the cost determination for each drafting arrangement that is under consideration can reflect fuel expenditure and/or other vehicle operational costs. Each considered drafting arrangement can thus be evaluated as a comparison of drafting duration (or benefit) versus cost for implementing the drafting arrangement. Based on the evaluation, the possible drafting arrangements can be ranked, with selection of drafting arrangements to employ being based on furthering the objectives of the network computer system 100.

The matching component 162 can generate the drafting determinations as a response to one or more types of triggers. By way of example, the matching component 162 can respond to a request from one or more multiple freight operators who request drafting arrangements, either based on their respective current location or based on a planned or future location. As an addition or alternative, the matching component 162 can generate matching determinations 165 automatically by monitoring the activities of the eligible freight operators. In examples, the matching component 162 can repeatedly query the activity data store 118 to identify, for example, eligible freight operators who have a current location, bearing and/or route that satisfies a proximity condition with another freight operator and/or candidate commencement location. In such examples, the proximity condition can be based on a length of travel (e.g., as measured by Haversine distance, route distance, trip time, etc.) between (i) two or more eligible freight operators operating on a compatible route, and/or (ii) a candidate freight operator and/or a candidate commencement location. In examples, the matching component 162 can repeatedly query (e.g., every 5 minutes, hour, etc.) the activity data store 118 to make the drafting determinations over a given time interval (e.g., 12-hour period corresponding to daytime driving) and a given geographic region.

In addition to satisfying a proximity condition, in some variations, the matching component 162 can match two or more freight operators based on a determination that a current or planned route of the matched freight operators overlap in length or duration by an amount which exceeds a threshold. In such examples, the current or planned route of the matched freight operators can be determined based on a next planned freight stop and a projected or acceptable time of arrival for the freight operator to arrive at the respective next planned freight stop.

In some variations, the matching component 162 identifies candidate set of freight operators for possible drafting arrangements, where the drafting arrangement between any pair or group of candidate freight operators of the set is deemed possible, subject to further evaluation. By way of example, the matching component 162 can implement a process to identify possible drafting arrangements amongst candidate freight operators, where the possible drafting arrangements are ranked and scored in accordance with one or more objectives of network computer system 100. As an addition or variation, freight operators can be ranked for possible drafting arrangements based on a respective proximity of each freight operator to another candidate freight operators. From the ranking of possible drafting arrangements, matching component 162 selects individual drafting arrangement for implementation. To implement a drafting arrangement, the matching component 162 can cause each identified freight operator of the potential drafting arrangement to receive a drafting invitation to participate in the drafting arrangement. When each identified freight operator accepts the corresponding drafting invitation, the matching component 162 records the data set for the matching determination 165. When individual freight operators reject drafting arrangements, the matching component 162 can reevaluate the possible drafting arrangements by, for example, ranking and scoring the possible drafting arrangements without inclusion of the freight operator who rejected the invitation. The matching component 162 can reselect individual drafting arrangements, and repeat an invitation process until the selected drafting arrangement is accepted by the invited freight operators.

In examples, the matching component 162 can communicate, via the communication interface 116, drafting invitations to mobile devices 140, 142 of candidate freight operators. Each drafting invitation can include content which identifies, for example, a commencement location or region for the drafting arrangement. The drafting invitations can be interactive to enable, for example, the receiving freight operators to interact with the respective executing service applications 141, 143, in order to elect participation in the identified drafting arrangement. For example, the matching component 162 can communicate programmatic instructions to the respective service applications 141, 143 executing on corresponding mobile devices 140, 142, to cause the respective service applications to generate one or more graphical features (e.g., soft buttons) that enable the invited freight operators to respond to the drafting invitations. In examples, the drafting invitations can also display content to communicate, for example, a drafting plan 175 (or portion thereof) for the drafting arrangement. Each drafting invitation may also include content that indicates, for example, a potential saving (e.g., fuel saving) for the freight operator if the freight operator elects to participate in the identified drafting arrangement. For example, the network computer system 100 can identify a cost saving associated with each unit distance (e.g., mile or kilometer driven) during which drafting occurs. The response from the freight operators to the drafting invitations can be generated through the respective service applications 141, 143 (e.g., through interaction with a graphical feature), through a messaging medium, or through inaction (e.g., no response means the freight operator declined the drafting invitation).

As an addition or variation, each matching determination 165 can be associated with a drafting plan 175, where the drafting plan 175 identifies a commencement location 167 for the drafting arrangement. In examples, the drafting plan 175 can also identify, a completion location for the drafting arrangement. Still further, the drafting plan 175 can identify a route, roadway or series of roadways for the freight operators to use, while drafting, in order to reach the completion location. As another addition or variation, the drafting plan 175 can identify a speed or configuration for the drafting arrangement, including, for example, a drafting position of each freight operator, and/or a location where the freight operators are to switch drafting positions.

The matching component 162 can determine the draft completion location based on, for example, a determination of the planned route for each freight operator of the drafting arrangement. The determined draft completion location can correspond to a location on an overlapping portion of the planned route for each freight operator. In variations, the matching component 162 can also determine the draft completion location based on suitability factors for the respective roadway or route segment leading to the draft completion location. Such suitability factors can include, for example, the type or nature of roadway (e.g., wider roadways may be deemed more suitable for drafting), the amount of traffic that is expected to be on the roadway, and/or environmental conditions (e.g., rain or snow on the roadway). In determining the draft completion location, the matching component 162 can also identify freight operator limitations, such as a limitation in the duration by which the freight operator can continue to operate the freight vehicle continuously (e.g., in order to be in compliance with a government regulation and/or carrier requirement). The matching component 162 may also consider freight operator limitations that include an amount of fuel remaining in the freight operator's freight vehicle, and/or an indicated or determined preference (e.g., based on a freight operator profile) of the individual freight operator. Accordingly, in such examples, the matching component 162 can determine the draft completion location to be based on an objective of maximizing the length or duration of the drafting arrangement, subject to constraints of (i) consideration of suitability factors, and (ii) consideration of freight operator limitations.

In examples, the matching component 162 can select commencement locations 167 for matched freight operators to commence drafting based on, for example, the current location of the respective freight operators and/or a current or planned route of each of the respective freight operators. In variations, the matching component 162 can select freight operators for matching to suitable drafting commencement locations. In either case, a given matching determination 165 can be based on a selected commencement location 167, such that the current locations of the respective freight operators satisfy one or more proximity conditions with respect to the commencement location 167. By way of example, the commencement location 167 can be determined by the closest suitable location where two freight operators can converge and commence drafting, such as, for example, a point of intersection as between existing or planned routes of matched freight operators. In variations, the commencement location 167 can correspond to a point on a shared route where one freight operator can overtake another freight operator. Still further, the matching component 162 can identify a route deviation for one or both freight operators to reach a commencement location.

In examples, a commencement location 167 can correspond to a segment of a roadway, where matched freight operators can converge and commence drafting without stopping. For example, the commencement location 167 can correspond to a commencement location where one freight operator waits for another freight operator, before drafting is commenced.

In examples, the matching component 162 can select commencement locations 167 for drafting arrangements through a process where one or more candidate locations are selected for evaluation, then evaluated based on one or more predetermined criteria. Through evaluation, the matching component 162 can score a candidate location based on the potential for the candidate location to satisfy one or more proximity conditions for matched freight operators. For example, the matching component 162 can select the commencement location 167 for matched freight operators to be the nearest locations where two potential freight operators can intersect, converge or meet, given each freight operator's route, heading and/or current location. The matching component 162 can also score candidate locations based on one or more proximity conditions, such as (i) a determination that each selected freight operator will arrive at the selected commencement location within a given window of time, such that, for example, a first arriving freight operator will not wait more than a threshold period of time; and/or (ii) a determination (e.g., prediction) that neither of the freight operators will be delayed from arriving at their planned destination by more than a threshold duration of time as a result of the drafting being initiated from the selected commencement location 167.

As an addition or variation, the candidate commencement locations can be evaluated against one or more suitability conditions, such as ease or accessibility of the respective candidate location to freight operators of a matching determination 165. For example, a candidate commencement location can be evaluated based on a size of the shoulder (e.g., to permit one freight operator to stop and wait for another freight vehicle), the availability of an amenity (e.g., rest stop, or refueling stop), and/or the proximity of the candidate commencement location 167 to the main route of travel (e.g., highway).

When multiple candidate commencement locations are possible for a given matching determination 165, the matching component 162 can determine the commencement location 167 to be the candidate location that is most suitable, based on scoring or ranking candidate commencement locations for potential drafting arrangements. For example, the most suitable candidate commencement location can correspond to the location that, if selected for two or more matched freight operators, results in the least delay amongst other candidate commencement locations with respect to arrival time of one or both matched freight operators. As an addition or alternative, the most suitable candidate commencement location can correspond to the candidate location that would, if selected, provide the greatest fuel conservation and/or least amount of additional travel (e.g., route deviation) as compared to other candidate commencement locations for a matched set of freight operators.

According to examples, when matched freight operators are determined and invited for participation to a given drafting arrangement, the drafting status for the matching determination 165 can be updated. In some examples, the drafting status can reflect when respective freight operators (i) receive or accept drafting invitations, (ii) operate freight vehicles to travel to commencement locations where drafting arrangements are to commence, and/or (iii) are in process of participating in a drafting arrangement.

According to some examples, the draft commencement component 164 can initiate one or more processes to coordinate the arrival of the selected freight operators to a respective commencement location 167. In examples, the draft commencement component 164 can coordinate each freight operator to arrive at the commencement location 167 within a given window of time. The draft commencement component 164 can query the activity data store 118 to obtain, for example, the current location, heading and route of each freight operator for a given drafting arrangement. Based on the retrieved information, the draft commencement component 164 can generate content to guide each freight operator to the commencement location 167. The instructions can specify, for example, a speed for the freight operator to travel to the commencement location 167.

As an addition or variation, the draft commencement component 164 can generate the freight operating instructions to guide the activity or actions of the early arriving freight operator at the commence location. In examples, the instructions may be generated to influence the manner in which the freight operator operates the freight vehicle, with an objective to minimize a difference in the arrival time of each freight operator to the commencement location of the respective drafting arrangement. The freight operating instructions can specify, for example, a speed which the freight operator should drive at, and/or a particular route the freight operator should use to arrive at the commencement location 167.

In variations, the freight operating instructions are generated to facilitate or influence the freight operator in minimizing unproductive time. In such examples, the freight operating instructions can identify a task or activity which the freight operator can perform (e.g., refueling) before arriving at the commencement location, based on the expected arrival time of each freight operator and/or the allotted window of time for the freight operators to meet at the commencement location 167.

In examples, the draft commencement component 164 can also specify freight operating instructions for the freight operator to follow at the commencement location 167. For example, in cases where one freight operator arrives at the commencement location 167 before another freight operator, the draft commencement component 164 can also generate freight operating instructions to guide the early freight operator to wait at the commencement location 167. The freight operating instructions can also specify, for example, an amount of time which the early arriving freight operator can use as a rest stop. Still further, the freight operating instructions can identify a time-saving task which the freight operator can perform at the commencement location (e.g., fuel the freight vehicle).

In examples, the freight operating instructions can further identify a particular landmark or stopping point (e.g., mile marker, exit, rest stop, etc.) where the early-arriving freight operator is to stop and wait. As another example, the freight operating instructions can specify actions where the freight operator is to ready the freight vehicle to participate in the drafting arrangement. For example, the freight operating instructions can instruct the freight operator to maneuver the respective freight vehicle to have a particular orientation (e.g., oriented to face on ramp from rest stop) so that the freight operator can accelerate and meet the other freight operator without the other freight operator having to stop or slow down. Still further, the draft commencement component 164 can display a timer that indicates a duration until arrival of the other freight operator of a given drafting arrangement.

Accordingly, in examples, the draft commencement component 164 can generate content that identifies the commencement location 167, such as content that facilitates the freight operator to visually locate the commencement location 167 while operating a corresponding freight vehicle. As an addition or variation, the draft commencement component 164 can generate navigation content to facilitate the freight operator in arriving at the commencement location 167. Still further, the draft commencement component 164 can generate content that displays a timer for one freight operator to arrive at the commencement location 167, or to mark or otherwise visually identify each freight operator to the other freight operator.

In coordinating each freight operator to arrive at the commencement location 167, the draft commencement component 164 can track the progress of each freight operator to the commencement location 167 in order to make adjustments or changes to the operator's operation of the freight vehicle. The draft commencement component 164 can, for example, retrieve information (e.g., current location, speed, bearing) from the activity data store 118 to determine whether each freight operator of the matching determination 165 is likely to arrive at the commencement location 167 within a threshold window of time (e.g., within 1 minute of each other). In making the matching determination 165, the draft commencement component 164 can, determine an expected progress of each freight operator in operating their respective freight vehicle over a time interval that precedes the expected arrival time for that freight operator. The draft commencement component 164 can track each freight operator, using the current location of each operator, in order to determine whether either freight operator is deviating from the calculated arrival time. Additionally, the draft commencement component 164 can repeatedly compare the recalculate an expected arrival time for each freight operator as the freight operator progresses towards the commencement location 167.

To minimize the difference in arrival times of the freight operators, the draft commencement component 164 can specify freight operation instructions as a control to modulate the arrival time of one or both freight operators. For example, the draft commencement component 164 can generate freight operating instructions to cause the freight operator to reduce or increase speed, in order to change the arrival time of the freight operator to better match the arrival time of the other freight operator to the drafting arrangement. By influencing the speed of the individual freight operators, the draft commencement component 164 can influence the respective freight operators to conserve fuel, as compared to the freight operators operating at higher speeds (that are less efficient for fuel conservation) and/or shutting the freight vehicle down. The draft commencement component 164 can also generate freight operating instructions to change, for example, the expected wait time of the other freight operator at the commencement location 167. Still further, the draft commencement component 164 can generate freight operating instructions to suggest an additional or different activity which the freight operator can perform while waiting for the drafting arrangement to commence.

Still further, in other variations, the draft commencement component 164 can evaluate and reevaluate the commencement location 167 which is selected for a particular drafting arrangement, as compared to other candidate locations which can be deemed more suitable based on the progression of the respective freight operators. For example, the draft commencement component 164 can track one or both freight operators to calculate a wait time by one freight operator, or a difference between the arrival times of the paired freight operators, with respect to each freight operator's expected arrival time at the commencement location 167. At the same time, the draft commencement component 164 can evaluate other candidate locations as alternatives to the commencement location 167. For example, the progression of one freight operator to the commencement location 167 may be slower than expected, resulting in the other freight operator having to wait at the commencement location 167. In such a scenario, the draft commencement component 164 can select another location along their respective shared route to be the commencement location, if the draft commencement component 164 determines that the difference between the arrival times of the two freight operators will be less with respect to the newly evaluated commencement location 167. As an addition or alternative, the draft commencement component 164 can select a new commencement location 167 because the expected wait time for the freight operator will permit the freight operator to perform an activity (e.g., refuel) which he would not otherwise be able to perform at the previously selected commencement location. In this manner, the draft commencement component 164 can repeatedly evaluate commencement locations 167, and select new commencement locations based on progressions of the respective freight operators.

In examples, the tracking component 166 detects when drafting commences as between two freight operators of a drafting arrangement. For example, the tracking component 166 can implement a process to repeatedly retrieve the current location of each freight operator from the activity data store 118. The tracking component 166 can, for example, compare the current location of each freight operator over a given duration to determine that drafting is taking place (e.g., the current location of each freight operator is deemed to be the same geographic coordinate at a substantial number of instances over a given time interval). In variations, the tracking component 166 can also use additional types of information to detect when drafting has commenced. For example, the tracking component 166 can compare the respective speed of each freight operator, where the speed of each freight operator is based on a calculated distance that the freight operator travels (e.g., as determined from repeated determinations of the current location for each freight operator) over a given time interval.

As an addition or variation, the tracking component 166 can compare the respective acceleration of each freight operator, where the acceleration of each freight operator can be determined from, for example, information communicated by the respective service applications 141, 143 using the accelerometers or gyroscopes of the respective mobile devices. Still further, in some variations, each freight operator can provide input through an interface of the respective service application 141, 143, to indicate when drafting is taking place. According to some examples, the matching determination 165 can include a drafting plan 175 which identifies configuration information for each drafting assignment. The drafting plan 175 can identify a switch location where the freight operators are to switch drafting positions.

In variations, the drafting plan 175 can also identify which freight operator is to occupy each position of the drafting arrangement. In a two-freight vehicle arrangement, the drafting positions can include a lead position and a tail position. At the switch location, the freight operator who had been in the tail position is switched to the lead position, while the freight operator who had been in the lead position is switched to the tail position. In a three or group freight vehicle arrangement, the switch location can be used to trigger the freight vehicle in the lead position to fall into the tail position.

In examples, the drafting plan 175 can be determined in advance, such as upon the freight operator accepting the drafting invitation to draft. In variations, the drafting plan 175 can be at least partially communicated to freight operators just prior to drafting commencing and/or prior to the drafting positions being switched. For example, prior to drafting commencing, the tracking component 166 can determine the position of each freight operator for the drafting arrangement. The tracking component 166 can make the determination as to which freight operator has the lead position based on a variety of factors, such as the position or orientation of the respective freight vehicles when both freight operators are at the commencement location 167. For example, the tracking component 166 can obtain the current location and/or velocity of each freight operator to determine which freight operator can occupy the lead position in the least amount of time upon drafting commencing.

In some examples, when drafting commences, the tracking component 166 communicates, via the communication interface 116, an indicator of the switch location to each freight operator. For example, the tracking component 166 can communicate a remaining distance or time until the switch position is reached. As an addition or variation, the tracking component 166 can communicates a notification or alert to the operator device 140, 142 of each freight operator when the switch location is reached. Still further, freight operating instructions can be communicated to individual freight operators to enable the freight operators to switch drafting positions, such that the freight operators may not need to communicate directly with one another. For example, when the switch location is reached, the tracking component 166 can provide freight operating instructions to each freight operator to cause the freight vehicle in the tail position to move into the passing lane and accelerate, while causing the freight vehicle in the lead position to slow without changing lanes. The tracking component 166 can also provide an interface to prompt each freight operator to signal input when the switch is complete. As an addition or variation, the tracking component 166 can programmatically verify that the freight operators have switched, as well as the location where the switch occurred. The tracking component 166 can make the programmatic verification by querying or otherwise accessing, from the activity data store 118, the current location, the freight vehicle's velocity and/or other information.

In examples, the tracking component 166 can monitor the freight operators of the drafting arrangement until the drafting is completed or terminated. The tracking component 166 can, for example, analyze the current location, velocity and/or other information to evaluate each freight operator's performance when drafting. When the completion location is reached, the tracking component 166 can notify or otherwise signal the mobile devices 140, 142 of each freight operator to indicate the drafting arrangement is complete.

The tracking component 166 can also determine when the drafting arrangement is terminated before the completion location is reached. The tracking component 166 can compare, for example, the current location and velocity of each freight operator to determine when a variance in the location and/or velocity of each freight operator is detected. When such variances are detected, the tracking component 166 can mark the drafting arrangement as having been terminated.

In examples, the tracking component 166 can record information about each drafting arrangement as part of the drafting profile 152 for each freight operator. The tracking component 166 can record, for example, information such as the length or duration of the drafting arrangement, and the length and duration in which each freight operator operated the freight vehicle at a particular drafting position. The drafting profile 152 can be used to determine, for example, the drafting position of the freight operator at the start of a next drafting arrangement. For example, the tracking component 166 can record, in the drafting profile of a freight operator, that a freight operator spent more time in the lead position than in the tail position. On the next drafting arrangement, the matching component 162 can specify the drafting arrangement so the freight operator initially starts in the tail position, to ensure the freight operator receives the full benefit of the next drafting arrangement.

Methodology

Figure 2A:
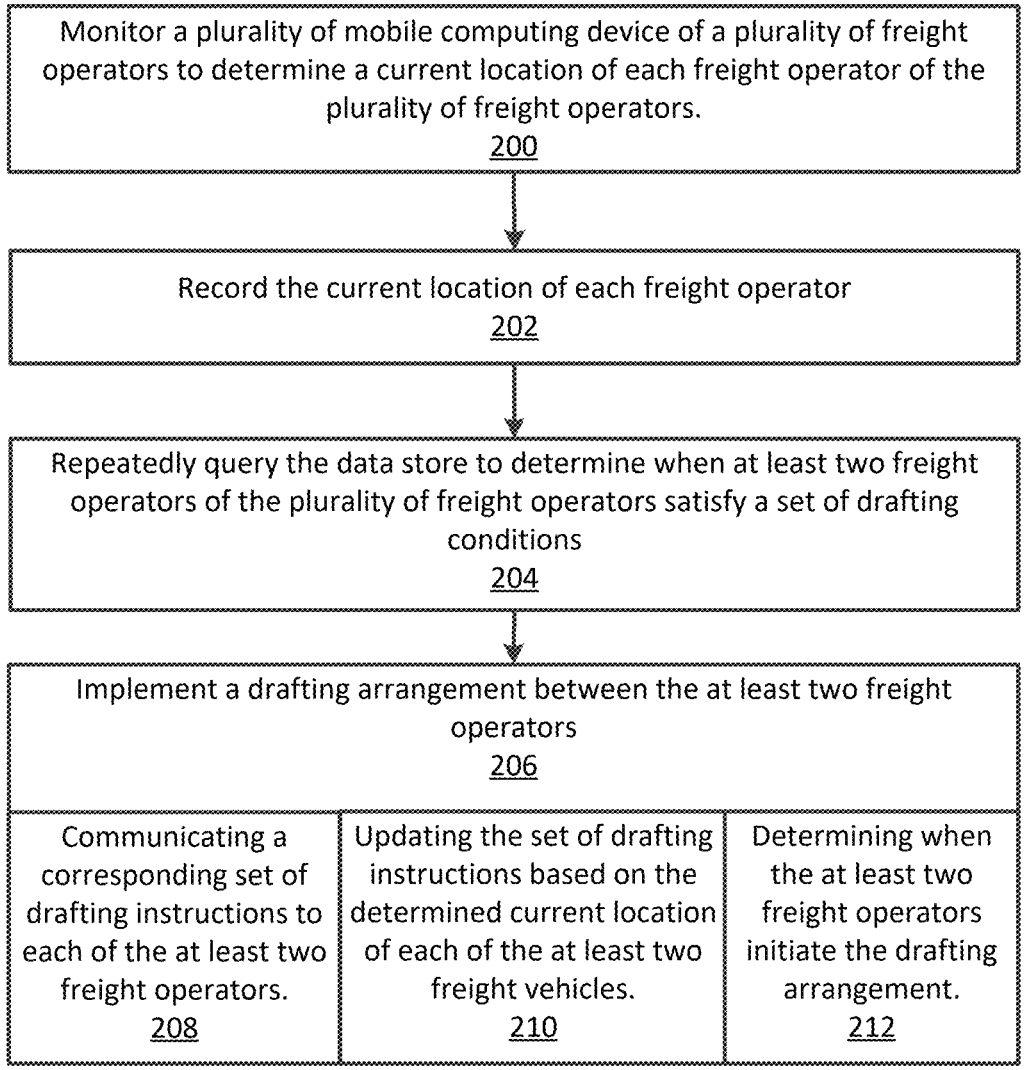
FIG. 2A illustrates an example method for selecting two or more freight operators or vehicles to participate in a drafting arrangement.

FIG. 2A illustrates an example method for selecting two or more freight operators or freight vehicles to participate in a drafting arrangement. In describing an example of FIG. 2A, reference is made to elements of FIG. 1 for purpose of illustrating a suitable component for performing a set or sub-step being described.

With reference to FIG. 2A, the network computer system 100 monitors mobile computing devices 140, 142 of freight operators to determine a current location of each freight operator (200). The network computer system 100 can utilize service applications 141, 143 executing on the mobile devices 140, 142 of corresponding freight operators to obtain the current locations of the mobile devices. In variations, the network computer system 100 can also obtain other types of information from the service applications 141, 143 executing on the respective mobile devices 140, 142, including, for example, information from sensor devices (e.g., accelerometer, gyroscope) and programmatic resources of the respective mobile devices. For example, the network computer system 100 can also receive and record sensor data from movement sensors of individual mobile devices.

The network computer system 100 can record the current location of each freight operator in a data store. For example, the network computer system 100 can associate a set of one or more records of the active data store 118 with each freight operator. Each record (or set of records) can include data sets that associate an account identifier of a corresponding freight operator to location information (e.g., a current location, recent locations, bearing, a route, etc.) determined from a corresponding mobile device of that freight operator. The record(s) for each freight operator can also associate the freight operator to other information pertaining to the activity of the freight operator, such as a current speed or speed profile and/or a current acceleration or acceleration profile of the freight operator. The record(s) for each freight operator can also associate the freight operator with the freight operator's current freight status (e.g., on route to pickup shipment, drop-off shipment, driving deadhead, etc.) and/or drafting status (e.g., unmatched for drafting, matched to drafting arrangement, commenced or in progress, etc.).

In some implementations, network computer system 100 implements processes to repeatedly query the active data store 118 to determine instances of at least two freight operators satisfying a set of drafting conditions (204). In examples, the matching component 162 can include processes to query the active data store for location information of freight operators operating in a given geographic region. By way of example, the location information can include (i) the current location of individual freight operators, (ii) recent location or bearing of the freight operators, and/or a (iii) current route or destination of the freight operator. The monitoring component 126 can further analyze the location information to two or more freight operators that satisfy a proximity condition as between the freight operators and/or a candidate commencement location. Still further, in examples, the set of drafting conditions may include a condition where the two freight operators are determined to be within a threshold distance (e.g., based on travel duration, travel distance, Haversine distance, etc.) of one another.

As an addition or variation, the set of drafting conditions can include a determination that the freight operators will likely be within a threshold distance of one another in a future time interval. For example, the matching component 162 can retrieve location information for a group of freight operators, such as, for example, the current location, bearing, route and/or future destination (or destinations) of the respective freight operators. The matching component 162 can use the retrieved information to match freight operators for drafting with one another based on an expected or future location of the freight operator. Thus, for example, the matching component 162 can select freight operators for drafting with one another in a time interval that may extend, for example, hours or days into the future.

In response to the determination, network computer system 100 implements a drafting arrangement between two or more freight operators (206). In some implementations, prior to the drafting arrangement being initiated, network computer system 100 can send drafting invitations to the freight operators that were selected for the drafting arrangement. Upon the selected freight operators accepting the respective drafting invitations, the network computer system 100 can implement the drafting arrangement.

In some examples, network computer system 100 implements the drafting arrangement by communicating a corresponding set of drafting instructions to each of the at least two freight operators (208). To illustrate, the drafting instructions can specify a commencement location, a route, and an operating speed for the freight operator to follow to timely arrive at the commencement location 167. The drafting instructions can also include navigation content to assist a freight operator in traveling to the commencement location. In variations, the drafting instructions may include an alternative route to the determined commencement location that may deviate from the predicted or planned route of the freight operator. The drafting instructions can direct each freight operator of the drafting arrangement to arrive at the commencement location within a window of time. In variations, the drafting instructions may also specify an activity which one freight operator may perform while waiting for another freight operator at the commencement location. For example, the drafting instructions can specify a wait time or a timer, or alternatively, advise the freight operator to refuel or perform some other activity while waiting for the other freight operator.

Once the freight operators of a drafting arrangement start traveling to the commencement location, network computer system 100 update the drafting instructions based at least in part on the current location of each of the respective freight operators (210). The drafting instructions may update, for example, the manner in which one or both freight operators operate their respective freight vehicles. By way of example, the drafting instructions can (i) update a speed which one or both freight operators travel to reach the commencement location, (ii) a wait time of one freight operator waiting at the commencement location and/or (iii) specify a new commencement location for one or both freight operators are to travel to.

As each freight operator reaches the commencement location, the network computer system 100 can implement processes to determine when the freight operators initiate drafting (212). In examples, the network computer system 100 can use the current location of each of the freight operators to determine when drafting begins. For example, the tracking component 166 can compare the current location of each freight operator to determine that the freight operators have initiated drafting. In variations, the tracking component 166 can also use additional information which may be recorded in the activity data store 118, such as the respective velocity and acceleration profiles of each of the freight operators.

Figure 2B:
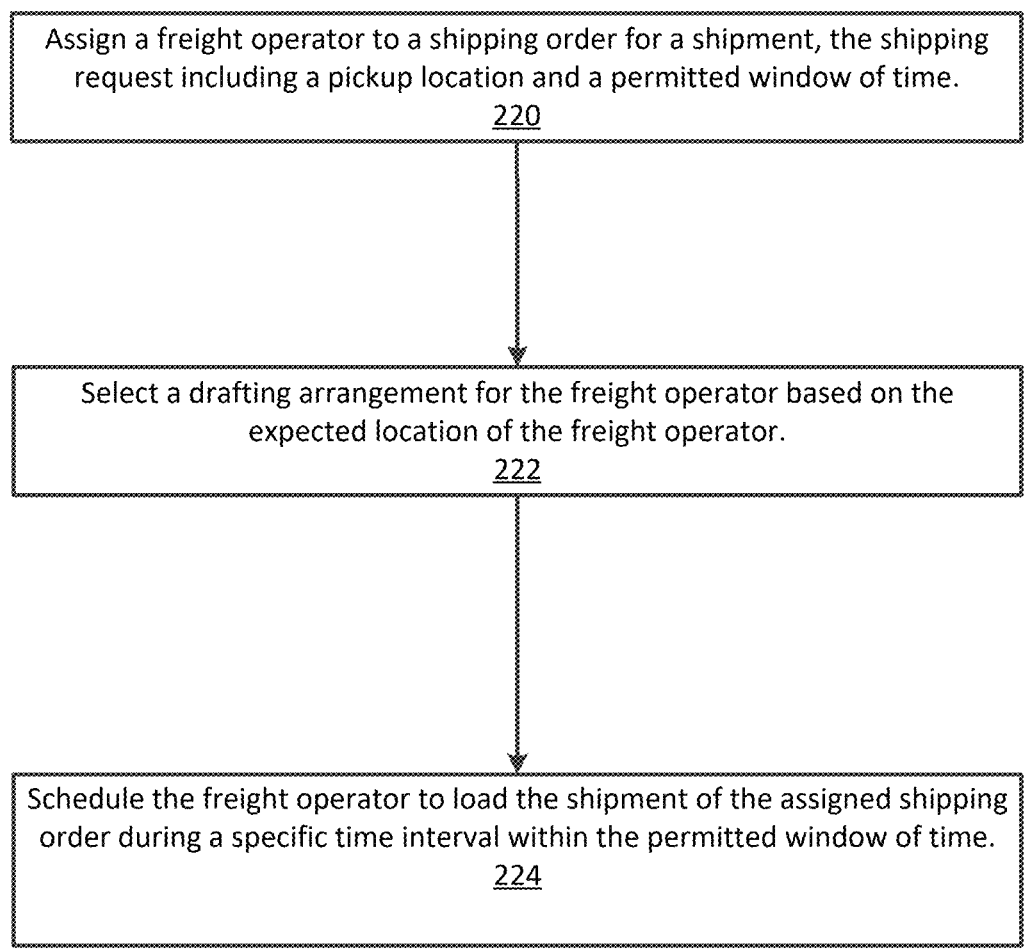
FIG. 2B illustrates an example method for scheduling a shipping assignment based on a drafting arrangement.
Figure 2C:
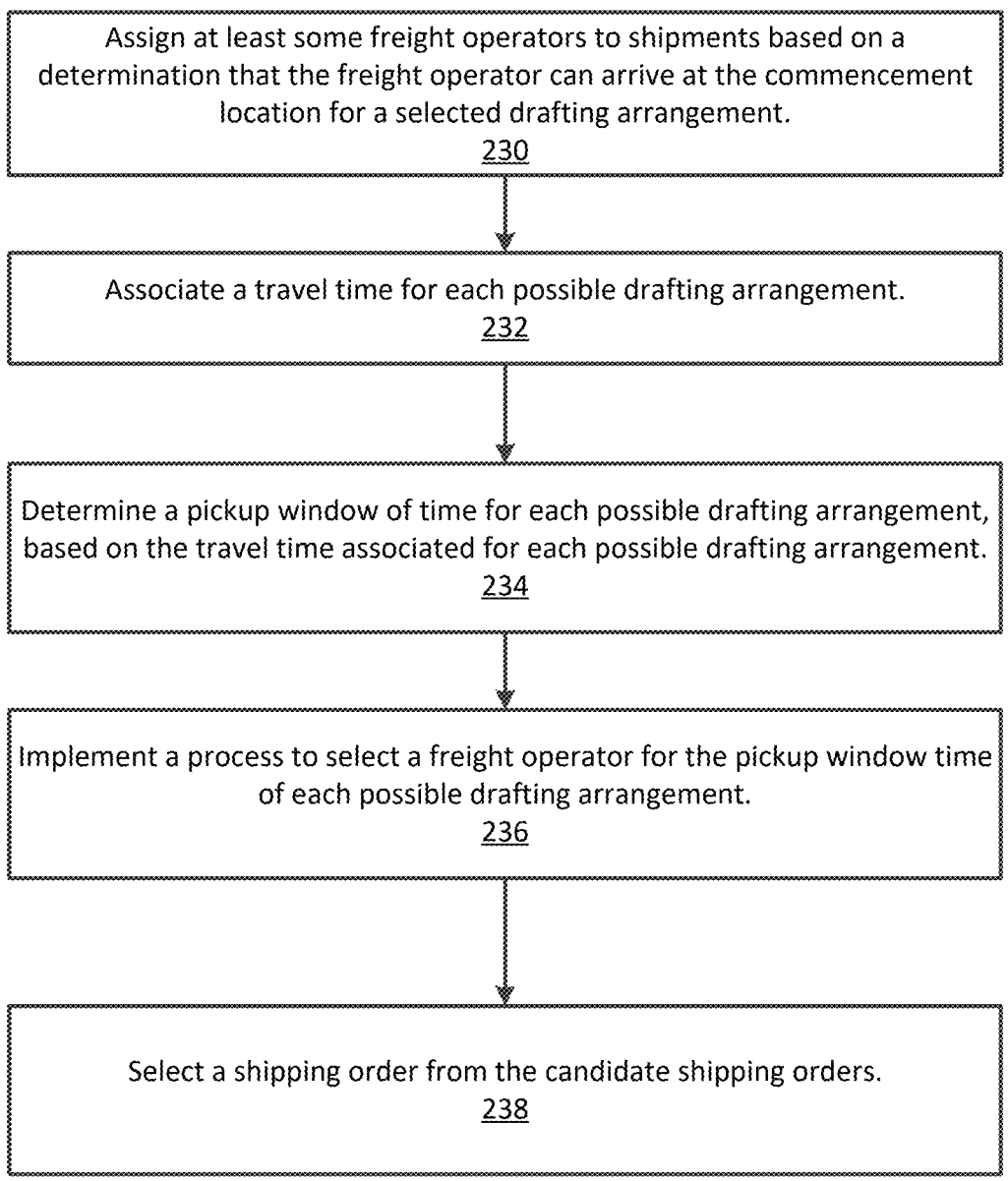
FIG. 2C illustrates an example method to assigning a shipment to a freight operator based on a drafting arrangement.

FIG. 2B illustrates an example method for scheduling a shipping assignment based on a drafting arrangement. FIG. 2C illustrates an example method to assigning a shipment to a freight operator based on a drafting arrangement. Examples such as described by FIG. 2B and FIG. 2C can be implemented using a freight management system that includes functionality for implementing drafting arrangements amongst freight operators. Accordingly, reference is made to the freight management system 10 and other elements of FIG. 1 for purpose of illustrating suitable components for performing a step or sub-step as described.

With reference to FIG. 2B, the freight management system 10 operates to assign a freight operator to a shipping order (220). The freight management system 10 can receive and process shipment orders from multiple shippers, where each shipper is associated with a shipper location where shipments can be picked up by freight operators. Accordingly, each shipping order can specify a freight load, a shipment or pickup location and a destination location. Shipping orders can also specify information about the freight load, such as a type of shipment (e.g., refrigerated or perishable). Additionally, the shipping orders can specify a permitted window of time for the freight order to pickup the shipment of the shipment order, and a permitted window of time for the freight operator to deliver the shipment at the destination location. The freight management system 10 can monitor a pool of freight operators to determine shipping assignments. In examples, the freight management system 10 can assign a freight operator to a shipping order based on a variety of factors, such as the location and availability of the freight operator, the destination of the shipping order, and/or an expected route for the shipping order.

The freight management system 10 can select a drafting arrangement for the freight operator that is assigned to the shipment order based on an expected location of the freight operator, either before or after the freight operator picks up the shipment (222). In selecting the drafting arrangement for the freight operator, the freight management system 10 can evaluate multiple possible drafting arrangements for the freight operator, given the pickup location and the permitted window of time when the shipment of the shipment order is to be picked up.

The freight management system 10 can then schedule the freight operator to load the shipment of the assigned shipping order during a specific time interval within the permitted window of time, based on the drafting arrangement that is selected for the freight operator (224). In examples, the freight management system 10 can schedule the freight operator to the specific time interval to minimize delay to when the selected drafting arrangement may commence. For example, the freight management system 10 can schedule the freight operator to pickup or load the shipment of the assigned shipping order based on the maximum time of arrival for the freight operator to arrive at the commencement location for the drafting arrangement, where the maximum time of arrival represents latest time which the freight operator can be expected to arrive at the commencement location after picking up the shipment during the scheduled time interval. To illustrate, the freight management system 10 can select a 1-hour time slot to schedule the freight operator's arrival, when the permitted window of time may encompass a 12-hour period. The freight management system 10 can schedule the freight operator for the specific time interval in order to time the arrival of the freight operator at the commencement location to be within a desired threshold duration (e.g., maximum permitted wait time) with respect to the arrival time of the other freight operator of the drafting arrangement.

In this way, the freight management system 10 can schedule loading times for freight operators based on drafting arrangements which the freight operator can participate in. Additionally, in some examples, the freight management system 10 can schedule the loading times to minimize the wait time of any one freight operator to the drafting arrangement.

In examples, the freight management system 10 can set the maximum wait time by default (e.g., system settings, carrier preference), by freight operator preference, or by scheduling requirements (e.g., expected or required delivery time) of the freight operator (or of the other freight operator to the selected drafting arrangement. Still further, some types of shipments (e.g., refrigerated shipments) may have additional costs or restrictions associated with wait time, and such considerations may set a limit for the maximum permitted wait time at the commencement location when the freight management system 10 is scheduling the freight operator.

With reference to an example of FIG. 2C, the freight management system 10 can assign at least some freight operators to shipping orders based on a determination that the freight operator can arrive at the commencement location for a selected drafting arrangement (230). In examples, the freight management system 10 can determine possible drafting arrangements for a given shipping order in advance of assigning the shipping order to a particular freight operator. The possible drafting arrangements can be determined by identifying other freight operators who are eligible for drafting and who are expected to be located within a threshold distance of either (i) the pickup location and/or (ii) an expected route for the assigned shipping order. For each possible drafting arrangement, the freight management system 10 can determine one or more likely commencement locations where drafting can be expected to commence. Additionally, the freight management system 10 can determine additional information for each possible drafting arrangement, such as an expected duration of the drafting arrangement.

The freight management system can associate a travel time for each possible drafting arrangement (232). In examples, the freight management system 10 can determine the associated travel time for each possible drafting arrangement to be the maximum travel time for a freight operator to travel to the commencement location from the pickup location.

The freight management system 10 can determine a pickup window of time for each possible drafting arrangement, based on the travel time associated for each possible drafting arrangement (234). For example, the pickup window of time for each possible drafting arrangement can be based on the maximum travel time from the shipper's location to the commencement location of that possible drafting arrangement.

The freight management system 10 can then implement a process to select a freight operator for the pickup window time of each possible drafting arrangement (236). In this way, candidate shipping orders can be determined for each possible drafting arrangement, with each candidate freight assignment identifying a freight operator and a corresponding possible drafting arrangement.

The freight management system 10 can then select a shipping order from the candidate freight assignments (238). In examples, each candidate shipping orders can be scored based on a set of predetermined criteria, such as, for example, the proximity of the commencement location to the pickup location, the availability of the other freight operator to participate in the drafting assignment, and/or the duration of the resulting drafting assignment.

FIG. 3A through FIG. 3E illustrate sample user interfaces that are displayed to freight operators, in connection with a network computer system implementing a drafting arrangement between the freight operators. In examples, the user interfaces 310, 312 are displayed on the mobile devices 320, 322 of freight operators while the freight operators operate their respective freight vehicles 302, 304 to implement drafting. The user interfaces can display drafting content representing, for example, drafting instructions for each freight operator to follow, where the content is communicated from, for example, a network computer system such as shown with an example of FIG. 1.

In examples, the drafting content displayed on each mobile device 320, 322 can be specific to the freight operator and the drafting arrangement. The drafting content displayed on each mobile device 320, 322 can incorporate information that is based on the position and/or activity of the other freight operator to the drafting arrangement. Additionally, the drafting content can be dynamic, meaning the content can change with the position of the freight operator and/or with the passage of time.

Figure 3A:
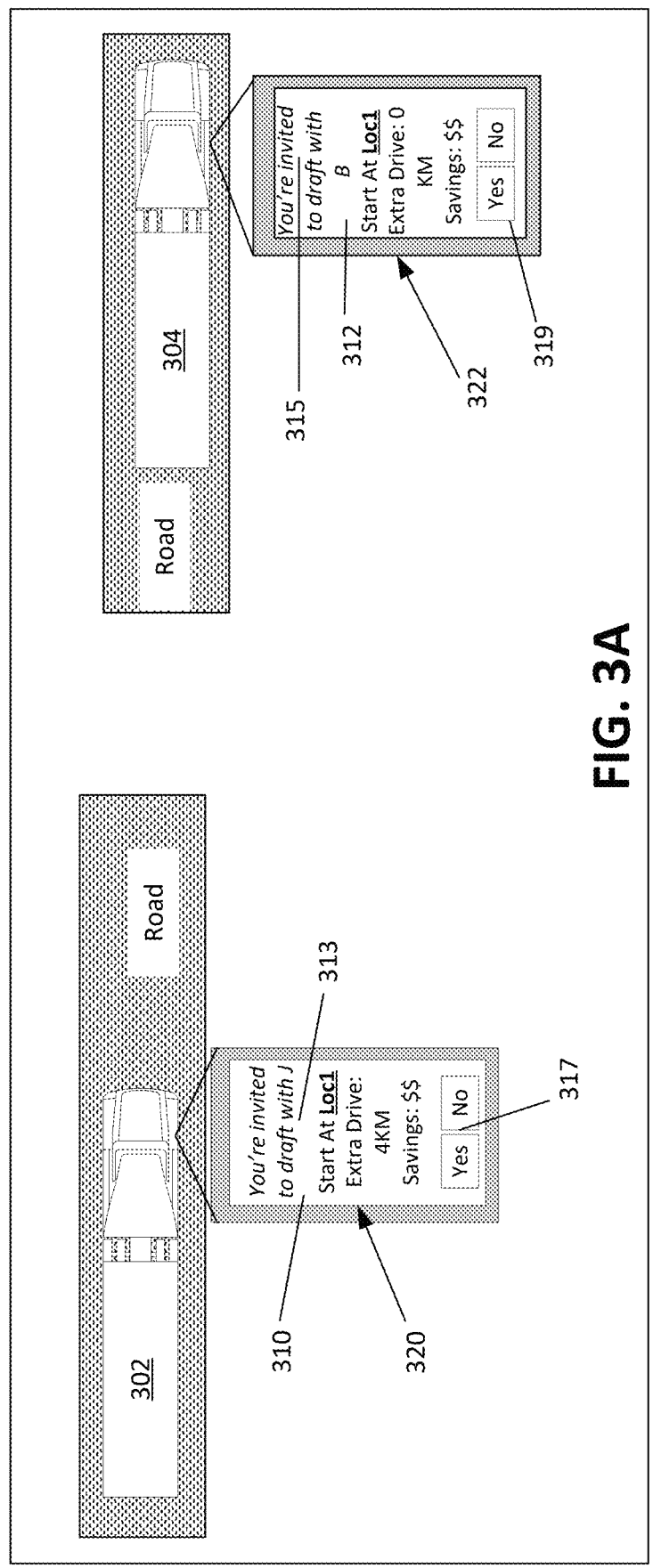

With reference to FIG. 3A, a network service (such as may be provided by network computer system 100) can select the freight operators of freight vehicles 302, 304 for a drafting arrangement. In examples, the freight operators may initially be selected as candidates. As candidates, the user interface 310, 312 of each mobile device 320, 322 may display drafting invitations 313, 315, which each freight operator can interact with to accept or reject. The drafting invitations 313, 315 can include information about the drafting arrangement of the invite. For example, as shown with an example of FIG. 3A, the drafting invitations 313 can identify the commencement location where drafting is to begin, and an indicator of the length or duration during which the two freight operators may draft. In some variations, the drafting invitations 313, 315 may also display information about the other freight operator who is participating in the drafting arrangement. Such information may include textual, visual and/or audio content. Among other types of information, the drafting invitations can display the experience of skill of the freight operator, the vehicle type that is used by the freight operator and/or recent history regarding the freight operator's drafting, such as information about the freight operator's most recent drafting arrangements (e.g., length or duration of drafting, geographic region where drafting occurred, etc.).

In examples, the drafting invitation 313 can also include an indication of the cost to the particular freight operator. For example, the drafting invitations 313, 315 can indicate the cost to the driver by displaying (i) a metric that is indicative of the amount of extra driving the freight operator is expected to do to participate in the drafting arrangement (e.g., distance that the freight operator would have to deviate from an expected or planner route to reach the commencement location); and/or (ii) a metric that is indicative of the amount of extra time that that the drafting would consume, as a result of, for example, the freight operator having to drive to the commencement location, the freight operator having to wait for the other freight operator, and/or the freight operator having to drive at a reduced speed because of, for example, drafting.

Additionally, in examples, the drafting invitations 313, 315 may communicate the expected savings or benefit that the freight operator would receive as a result of the freight operator participating in the proposed drafting arrangement. In examples, the savings can be expressed as currency or fuel savings, resulting from the expected increase in efficiency which each freight operator may receive when participating in the drafting arrangement.

In examples, the freight operators can accept the respective drafting invitations 313, 315 through interaction with an acceptance feature 317, 319. In an implementation, the acceptance feature 317, 319 can be a display feature, for which the operator can touch to indicate a response to the respective drafting invitation. In a variation, the acceptance feature 317, 319 can be auditory and/or a prompt which the freight operator can speak a response to (e.g., "Yes" or "Accept"). The network service may maintain a default answer for the freight operator, absent an affirmative indication that the freight operator wishes to accept the respective drafting invitation.

Figure 3B:
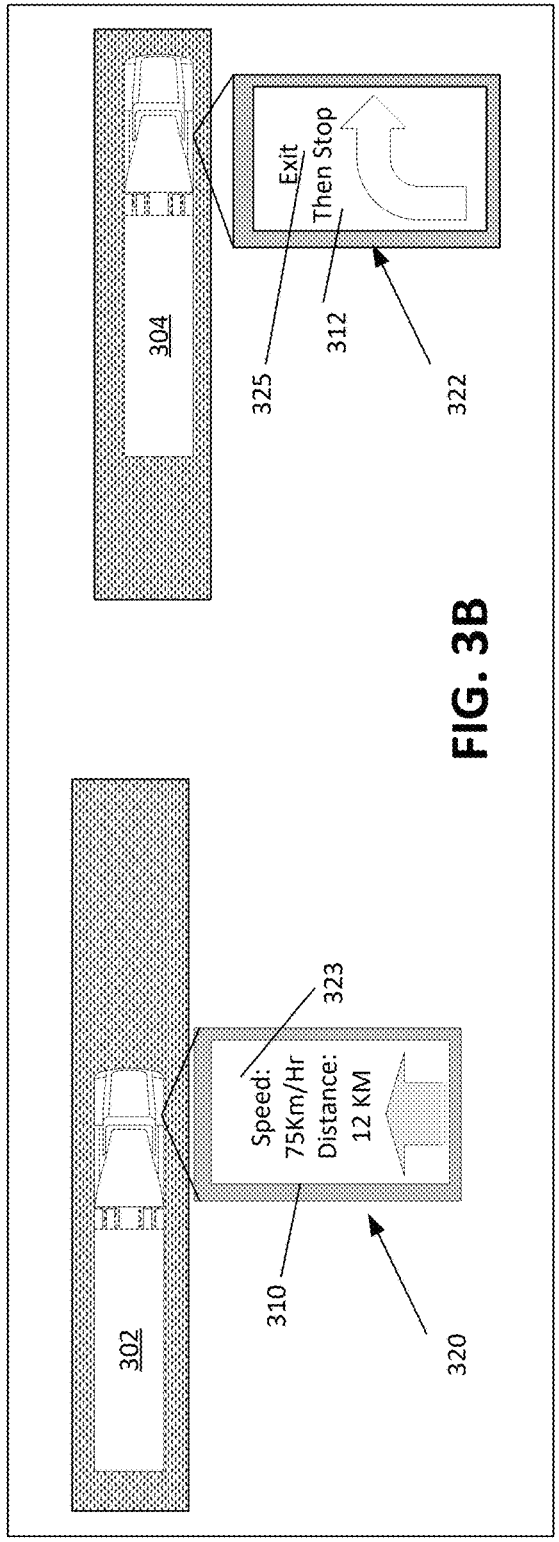

In FIG. 3B, once the freight operators elect to participate in the drafting arrangement, the mobile device 320, 322 of each freight operator may receive data to render drafting content 323, 325 on the user interfaces 310, 312 of the respective devices. As described with various examples, the drafting content 323, 325 may facilitate the freight vehicles 302, 304 to arrive at the commencement location within a predetermined window of time. In examples, the drafting content 323, 325 can include instructions for each freight operator to follow in operating their respective freight vehicle to reach the commencement location within a given window of time. While the freight operator 302, 304 is on route, the drafting content 323, 325 can include, for example, navigation instructions and/or instructions to specify the respective freight vehicle's operational speed. The drafting content 323, 325 communicated to each of the freight operators can be different, based on, for example, the location of each freight operator and/or the route which each freight operator is taking to the commencement location.

In examples, the drafting content 323, 325 can include instructions that, when followed by the respective freight operators, are expected to result in the freight operators arriving at the commencement location at about the same time, or within a threshold window of time. In providing the drafting content 323, 325, the network service can monitor the progress of one or both freight operators in traveling towards the commencement location. For example, the network service can repeatedly determine an estimated arrival time for one or both freight operators as their freight vehicles 302, 304 travel towards the commencement location. The network service can then vary the instructions of the drafting content 323, 325 to one or both freight operators, such as by changing the speed at which one or both freight operators are instructed to drive at, so that each freight operator's estimated time of arrival at the commencement location may change by a given amount. Thus, for example, if the freight operator of freight vehicle 304 is slowed in traveling to the commencement location, the network service can specify instructions in the drafting content 323 of the other freight operator, to cause the other freight operator to operate at similarly reduced speeds.

Figure 3C:
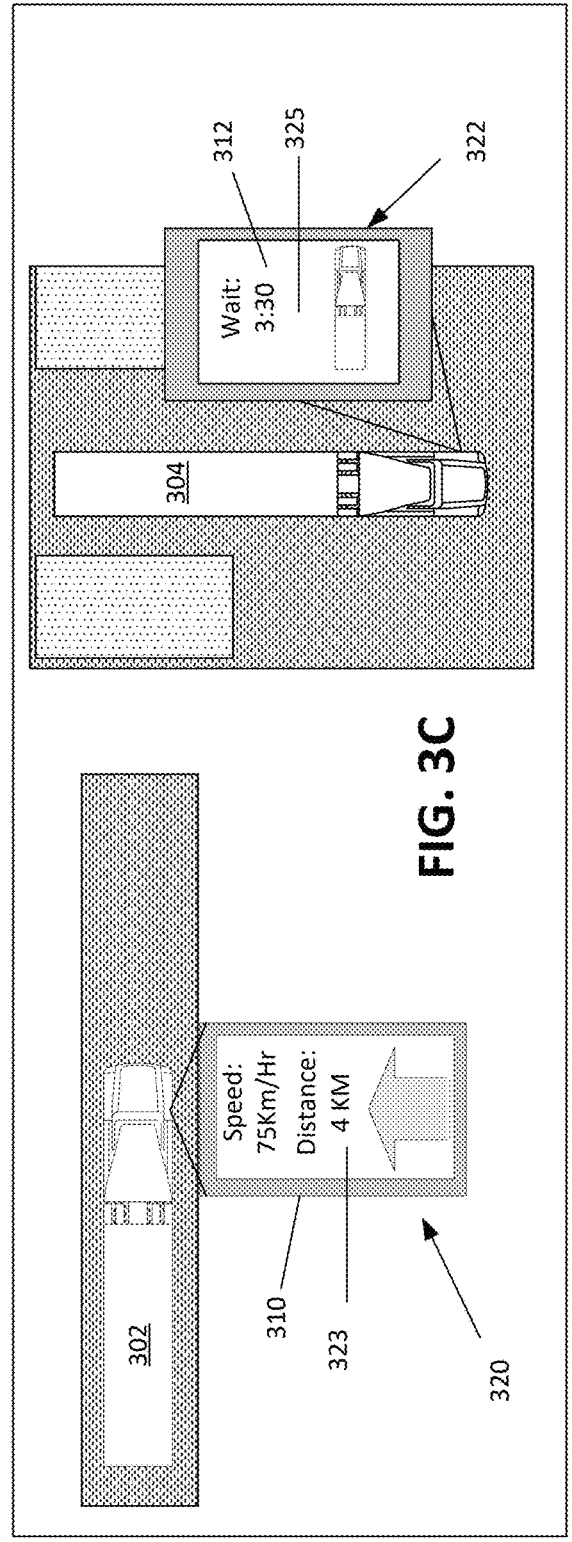

FIG. 3C illustrates the case where one of the freight operators (driving freight vehicle 304) reaches the commencement location before the other freight operator (driving freight vehicle 302). For the early-arriving freight operator of vehicle 304, the drafting content 325 can include a timer or other indicator for the expected arrival time of the freight operator of freight vehicle 302. While the freight operator of freight vehicle 304 waits, the drafting content 325 can include instructions that are displayed on the respective user interface 312 to inform the freight operator of activities that the freight operator may want to perform in advance of the arrival of the other freight operator. For example, the drafting content 325 can indicate when the freight operator should start his or her freight vehicle, and/or orient their respective freight vehicle so that the vehicle can be accelerated to a desired operating speed as the freight vehicle of the other freight operator arrives. In such examples, the information conveyed through the drafting content 325 to the freight operator of the freight vehicle 304 can be triggered and/or determined in part from information determined by monitoring the other freight vehicle 302 of the drafting arrangement.

Additionally, in examples, the drafting content 325 of the first arriving freight operator can be altered based on, for example, the progress of the other freight operator in traveling to the commencement location. For example, the drafting content 325 can display a timer or other timing indicator that is based on the expected arrival time of the other freight operator to the commencement location. If the arriving freight operator is delayed, however, then the drafting content 325 for the waiting freight operator can be increased to reflect the determined delay.

FIG. 3D and FIG. 3E illustrate the network service providing drafting content for each of the mobile devices 320, 322 as the respective freight vehicles 302, 304 are operated in a drafting configuration. In examples, the drafting content 323, 325 can display relevant information for the particular freight operator with respect to the drafting that the freight operators are performing. Additionally, the drafting content 323, 325 can be dynamic, in that the content can change over time, as the position of each freight operator changes over time. In FIG. 3D, for example, the drafting content 323, 325 can display the time or distance until the freight operators reach the switch position (where the respective freight operators switch drafting positions). The drafting content 325 provided for the freight operator in the lead position may differ from the drafting content 323 for the freight operator in the tail position. For example, the drafting content 325 for the freight operator in the lead can include instructions that provide for the freight operator to drop into the tail position when the switch position arrives, while the drafting content 323 for the freight operator in the tail position provides for the freight operator of the tail position to accelerate into the lead position when the switch position arrives. In FIG. 3E, the drafting content 323, 325 of each freight operator can display the time and/or distance until the freight operators reach the completion point, where drafting may stop.

Hardware Diagram

Figure 4:
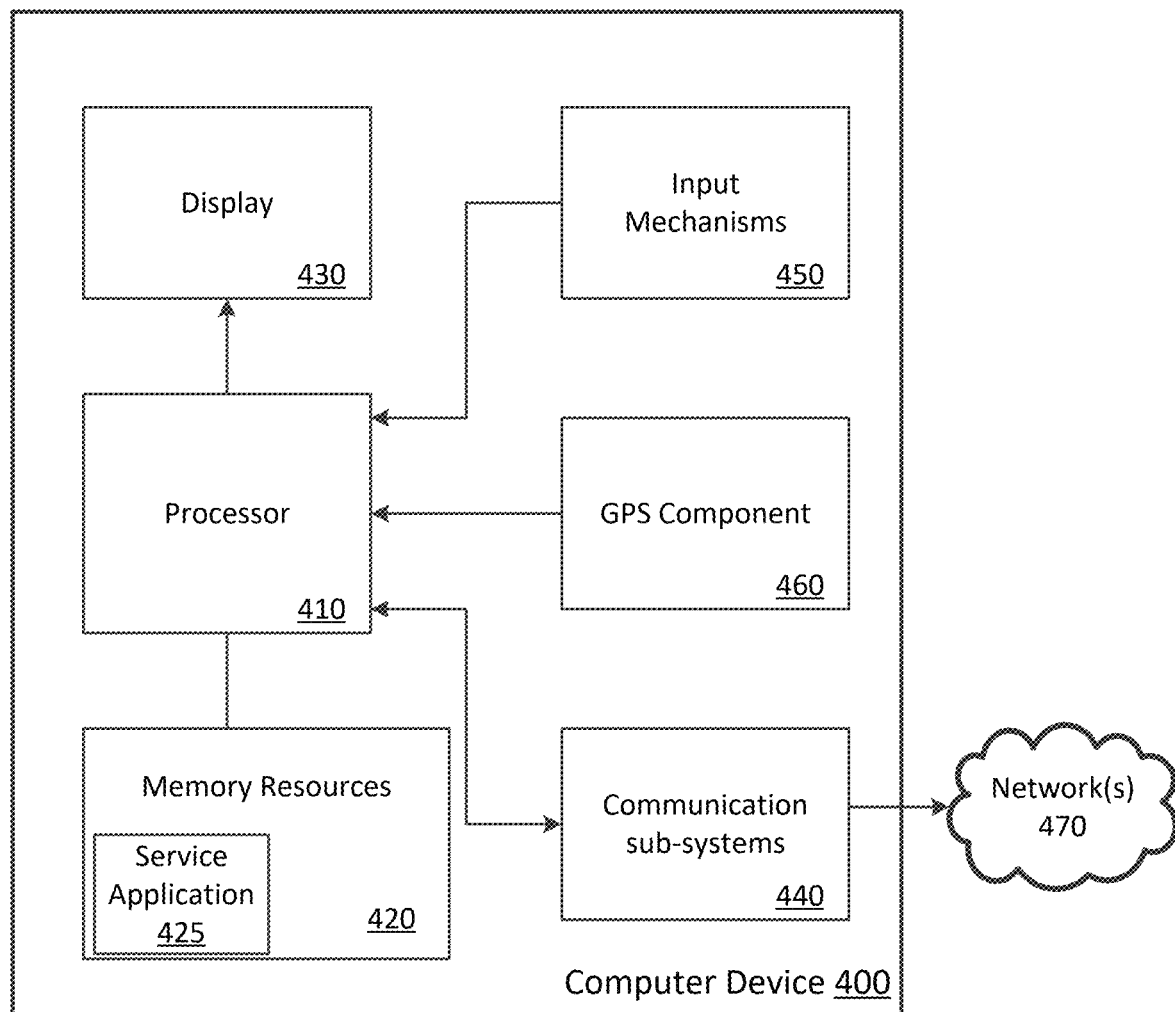
FIG. 4 illustrates a mobile device upon which aspects describe herein may be implemented.

FIG. 4 is a block diagram that illustrates a mobile device upon which examples described herein may be implemented. In one embodiment, mobile device 400 may correspond to, for example, a cellular device that is capable of telephony, messaging, and data services. In other examples, the mobile device 400 may correspond to an immersive-type computing device, such as an augmented-reality headset or wearable goggle device. The mobile device 400 can correspond to a device operated by a requester or, in some examples, a device operated by the service provider (e.g., a freight operator) that provides location-based services. Examples of such devices include smartphones, handsets, tablet devices, or in-vehicle computing devices that communicate with cellular carriers. The mobile device 400 includes processor 410, memory resources 420, display component 430 (e.g., such as a touch-sensitive display device), one or more communication sub-systems 440 (including wireless communication systems), one or more input mechanisms 450 (e.g., accelerometer and/or gyroscope, microphone, barometer, etc.), and one or more location detection components (e.g., GPS component) 460. In one example, at least one communication sub-system 440 sends and receives cellular data over network(s) 470 (e.g., data channels and voice channels). The one or more communication sub-systems 440 can include a cellular transceiver and one or more short-range wireless transceivers. Processor 410 can exchange data with a service arrangement system (not illustrated in FIG. 3) via the one or more communications sub-systems 440 and over network(s) 470.

Processor 410 can provide a variety of content to display component 330 by executing instructions stored in memory resources 420. Memory resources 420 can store instructions for service application 448. For example, processor 410 can execute the service application 448 to read data from one or more input mechanisms 450 of the computing device, and to transmit the data, along with location data of GPS component 460 as local device data to a network computer system (e.g., network computer system 100).

In examples, processor 410 can retrieve from memory resources 420 instructions for executing a service application 448. As described with other examples, service application 448 can enable an operator to receive information about an organizational structure of a freight load. Additionally, service application 448 can execute to generate one or more user interfaces, such as a navigation UI, as described in FIG. 1.

Figure 5:
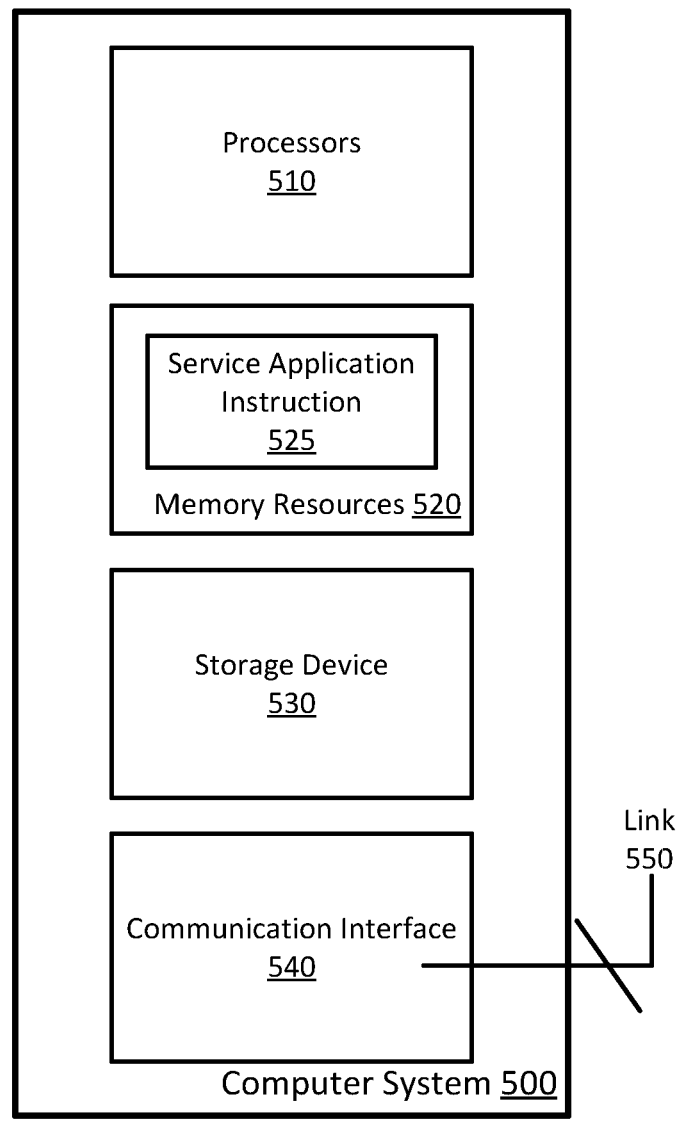
FIG. 5 illustrates a computer system on which one or more example network computer systems can be implemented.

FIG. 5 illustrates a computer system on which one or more example network computer systems can be implemented. Computer system 500 can be implemented on, for example, a server or combination of servers. For example, computer system 500 may be implemented as a server for a network computer system, such as shown and described with an example of FIG. 1. Likewise, computer system 500 can implement a method such as described with examples of FIG. 2A, FIG. 2B and/or FIG. 2C.

In one implementation, computer system 500 includes one or more processors 510, memory resources 520 (e.g., read-only memory (ROM) or random-access memory (RAM)), a storage device 530, and a communication interface 550. Computer system 500 includes at least one processor 510 for processing information stored in memory resources 520, such as provided by a random-access memory (RAM) or other dynamic storage device, for storing information and instructions which are executable by the one or more processors 510. Memory resources 520 also may be used for storing temporary variables or other intermediate information during execution of instructions to be executed by the one or more processors 510. Computer system 500 may also include memory resources 520 or other static storage device for storing static information and instructions for the one or more processors 510. Storage device 530, such as a magnetic disk or optical disk, is provided for storing information and instructions.

Communication interface 550 enables Computer system 500 to communicate with one or more networks (e.g., cellular network) through use of network link 580 (wireless or a wire). Additionally, computer system 500 can utilize network link 580 to communicate with one or more computing devices, specialized devices and modules, and one or more servers. The executable instructions stored in memory resources 520 can include instructions 542, to implement a network computing system such as described with an example of FIG. 1. The executable instructions stored in memory resources 520 may also implement a method, such as described with one or more examples of FIG. 2A, FIG. 2B and/or FIG. 2C.

As such, examples described herein are related to the use of computer system 500 for implementing the techniques described herein. According to an aspect, techniques are performed by computer system 500 in response to the one or more processors 510 executing one or more sequences of one or more instructions contained in memory resources 520. Such instructions may be read into memory resources 520 from another machine-readable medium, such as storage device 540. Execution of the sequences of instructions contained in memory resources 520 causes the one or more processors 510 to perform the process steps described herein. In alternative implementations, hard-wired circuitry may be used in place of or in combination with software instructions to implement examples described herein. Thus, the examples described are not limited to any specific combination of hardware circuitry and software.

Examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is claimed is:

1. A network computer system comprising:
   one or more processors;
   a set of memory resources to store a set of instructions, that when executed by the one or more processors, cause the network computer system to:
   determine one or more drafting arrangements for a shipping order;
   for each of the one or more drafting arrangements, determine a travel time from a pickup location of the shipping order to a commencement location for that drafting arrangement;
   for each of the one or more drafting arrangements, determine a pickup window of time based on the travel time associated with that drafting arrangement;
   monitor, over one or more networks, a plurality of mobile computing devices to determine a current location of a corresponding freight operator of a plurality of freight operators that is associated with each of the plurality of mobile computing devices;
   determine one or more freight operators for the shipping order based on the pickup window time for each of the one or more drafting arrangements and the current location of the one or more freight operators; and
   in response to the determination of the one or more freight operators for the shipping order, implement a drafting arrangement selected from the one or more drafting arrangements between at least two freight operators of the one or more freight operators.

2. The network computer system of claim 1, wherein the one or more drafting arrangements can be determined by identifying, based on location information of each respective freight operator of the one or more freight operators, other freight operators who are expected to be located within a threshold distance of at least one of (i) the pickup location of the shipping order or (ii) an expected route for the shipping order.

3. The network computer system of claim 1, wherein, for each of the one or more drafting arrangements, the network computer system can determine, based on location information of the one or more freight operators, a commencement locations where drafting is expected to commence.

4. The network computer system of claim 1, wherein a planned duration of a drafting arrangement is determined for each of the one or more drafting arrangements.

5. The network computer system of claim 1, wherein the travel time associated with the drafting arrangement represents a maximum travel time for a freight operator to travel to the commencement location from the pickup location of the shipping order.

6. The network computer system of claim 1, wherein the pickup window of time is based on a maximum travel time for a freight operator to travel to the commencement location from the pickup location of the shipping order.

7. The network computer system of claim 1, wherein the set of instructions further cause the network computer system to:
   prior to determining the one or more freight operators for the shipping order, determine a delivery window of time representing a period during which a freight operator can deliver a shipment associated with the shipping order to a destination location.

8. The network computer system of claim 7, wherein determining the one or more freight operators for the shipping order is further based on the delivery window of time for each of the one or more drafting arrangements.

9. The network computer system of claim 7, wherein the delivery window of time for each shipping order is specified by a respective drafting arrangement.

10. The network computer system of claim 1, wherein determining the one or more freight operators for the shipping order comprises scoring the shipping order based on a set of predetermined criteria.

11. The network computer system of claim 10, wherein the set of predetermined criteria comprises at least one of:
    a proximity of the commencement location to the pickup location of the shipping order;
    availability of at least one other freight operator to participate in that drafting arrangement; or
    a duration of that drafting arrangement.

12. The network computer system of claim 1, wherein each of the one or more drafting arrangements defines an arrangement in which a first vehicle drives in close proximity to a second vehicle to reduce drag on the first vehicle.

13. The network computer system of claim 1, wherein at least one of the one or more drafting arrangements specifies a switch position for a first freight operator to switch drafting positions with a second freight operator.

14. The network computer system of claim 13, wherein the switch position is based on at least one of:
- a location;
- a time; or
- an elapsed time period.

15. A non-transitory computer-readable medium storing instructions that, when executed by one or more processors, causes a network computer system to:
- determine one or more drafting arrangements for a shipping order;
- for each of the one or more drafting arrangements, determine a travel time from a pickup location of the shipping order to a commencement location for that drafting arrangement;
- for each of the one or more drafting arrangements, determine a pickup window of time based on the travel time associated with that drafting arrangement;
- monitor, over one or more networks, a plurality of mobile computing devices to determine a current location of a corresponding freight operator of a plurality of freight operators that is associated with each of the plurality of mobile computing devices;
- determine one or more freight operators for the shipping order based on the pickup window time for each of the one or more drafting arrangements and the current location of the one or more freight operators; and
- in response to the determination of the one or more freight operators for the shipping order, implement a drafting arrangement from the one or more drafting arrangements between at least two freight operators of the one or more freight operators.

16. The non-transitory computer-readable medium of claim 15, wherein the one or more drafting arrangements can be determined by identifying, based on location information of each respective freight operator of the one or more freight operators, other freight operators who are expected to be located within a threshold distance of at least one of (i) the pickup location of the shipping order or (ii) an expected route for the shipping order.

17. The non-transitory computer-readable medium of claim 15, wherein, for each of the one or more drafting arrangements, the network computer system can determine, based on location information of the one or more freight operators, a commencement locations where drafting is expected to commence.

18. The non-transitory computer-readable medium of claim 15, wherein a planned duration of a drafting arrangement is determined for each of the one or more drafting arrangements.

19. The non-transitory computer-readable medium of claim 15, wherein the travel time associated with the drafting arrangement represents a maximum travel time for a freight operator to travel to the commencement location from the pickup location.

20. A computer implemented method comprising:
- determining one or more drafting arrangements for a shipping order;
- for each of the one or more drafting arrangements, determining a travel time from a pickup location of the shipping order to a commencement location for that drafting arrangement;
- for each of the one or more drafting arrangements, determining a pickup window of time based on the travel time associated with that drafting arrangement;
- monitor, over one or more networks, a plurality of mobile computing devices to determine a current location of a corresponding freight operator of a plurality of freight operators that is associated with each of the plurality of mobile computing devices;
- determining one or more freight operators for the shipping order based on the pickup window time for each of the one or more drafting arrangements and the current location of the one or more freight operators; and
- in response to the determination of the one or more freight operators for the shipping order, implement a drafting arrangement from the one or more drafting arrangements between at least two freight operators of the one or more freight operators.

* * * * *